(12) United States Patent
Nomura et al.

(10) Patent No.: US 7,015,324 B2
(45) Date of Patent: Mar. 21, 2006

(54) TRIAZINE DERIVATIVE AND LIGHT EMITTING ELEMENT AND LIGHT EMITTING DEVICE INCLUDING THE SAME

(75) Inventors: Ryoji Nomura, Kanagawa (JP); Harue Nakashima, Kanagawa (JP); Satoko Shitagaki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/087,717

(22) Filed: Mar. 24, 2005

(65) Prior Publication Data

US 2005/0225236 A1    Oct. 13, 2005

(30) Foreign Application Priority Data

Mar. 25, 2004    (JP) .............................. 2004-090696

(51) Int. Cl.
  C07D 251/54    (2006.01)
  C07D 251/72    (2006.01)
  B32B 9/04    (2006.01)
  B32B 15/04    (2006.01)
  H01J 1/63    (2006.01)

(52) U.S. Cl. ...................... 544/198; 428/690; 428/917; 313/504

(58) Field of Classification Search ................. 544/198
See application file for complete search history.

(56) References Cited

U.S. PATENT DOCUMENTS 5,716,722 A    2/1998   Hamada et al.
2003/0214228 A1 *  11/2003   Itou ............................ 313/504

FOREIGN PATENT DOCUMENTS

JP    07-157473    6/1995
JP    08-199163    8/1996

* cited by examiner

*Primary Examiner*—Venkataraman Balasubramanian
(74) *Attorney, Agent, or Firm*—Eric J. Robinson; Robinson Intellectual Property Law Office, P.C.

(57) ABSTRACT

It is an object of the present invention to provide a novel material that can be used for manufacturing a light-emitting element.

A triazine derivative according to the present invention is represented by a general formula (1). In the general formula (1), $R^1$ to $R^{12}$ are individually any one of hydrogen, an alkyl group, an alkoxy group, a halogeno group, acyl group, an alkoxycarbonyl group, an aryl group, and a hetero cyclic ring, or $R^1$ and $R^2$, $R^3$ and $R^4$, $R^5$ and $R^6$, $R^7$ and $R^8$, $R^9$ and $R^{10}$, and $R^{11}$ and $R^{12}$ are individually bonded to form a ring. It is preferable that the heterocyclic ring has a monocyclic structure of a five- or six-membered ring, or a polycyclic structure including any one or both of a five-membered ring and six-membered ring, and includes any atom of nitrogen, oxygen, and sulfur.

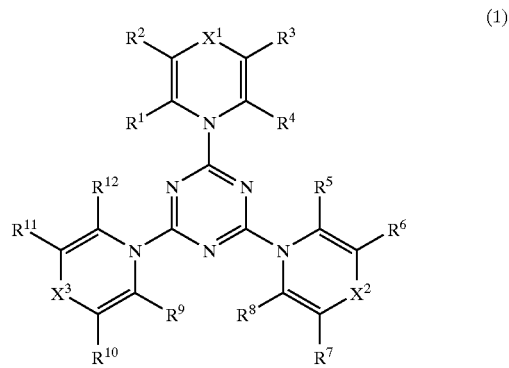

(1)

6 Claims, 13 Drawing Sheets

TRIAZINE DERIVATIVE AND LIGHT EMITTING ELEMENT AND LIGHT EMITTING DEVICE INCLUDING THE SAME

BACKGROUND OF THE INVENTION

1. Field of the Invention

The present invention relates to a triazine derivative, and also relates to a light-emitting element including the triazine derivative.

2. Description of the Related Art

In these years, many of light-emitting elements that are used in displays and the like have a structure in which a layer including a luminescent material is sandwiched between a pair of electrodes. In these light-emitting elements, light is emitted when an exciton formed by recombination of an electron injected from one of the electrodes and a hole injected from the other electrode returns to the ground state.

In the field of light-emitting elements, the structure of a layer including a luminescent material, a novel material for forming a layer including a luminescent material, or the like has been developed in order to obtain a light-emitting element that is superior in luminous efficiency and color purity or is able to prevent quenching or the like.

For example, as for the structure of a layer including a luminescent material, a multilayer structure composed of a combination of a layer including a highly carrier injecting material, a layer including a highly carrier transporting material, and the like is proposed so that a light-emitting region is formed at a point distant from electrodes. In addition, as for the highly carrier transporting material, for example, a triazine derivative disclosed Patent Document 1 or 2 is proposed.

(Patent Document 1) Japanese Patent Laid-Open No. 7-157473

(Patent Document 2) Japanese Patent Laid-Open No. 8-199163

SUMMARY OF THE INVENTION

It is an object of the present invention to provide a novel material that can be used for manufacturing a light-emitting element. In addition, it is also an object of the present invention to provide a light-emitting element that can be driven efficiently. Further, it is also an object of the present invention to provide a light-emitting element that is able to show a luminescent color closer to a luminescent color derived from a luminescent material.

A triazine derivative according to the present invention is represented by a general formula (1).

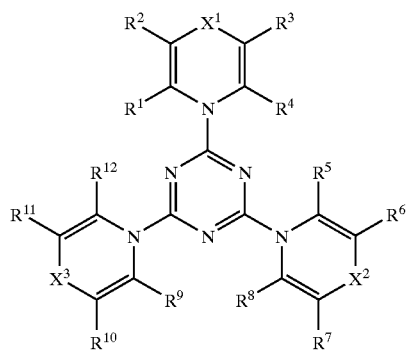

(1)

In the general formula (1), $R^1$ to $R^{12}$ are individually any one of hydrogen, an alkyl group having 1 to 6 carbon atoms, an alkoxy group having 1 to 6 carbon atoms, a hologeno group, an acyl group having 1 to 6 carbon atoms, an alkoxycarbonyl group, an aryl group having 6 to 30, preferably 6 to 14 carbon atoms, and a heterocyclic group having 2 to 18, preferably 2 to 14 carbon atoms. It is preferable that the heterocyclic ring has a monocyclic structure of a five- or six-membered ring, or a polycyclic structure including any one or both of a five-membered ring and six-membered ring, and includes any atom of nitrogen, oxygen, and sulfur.

Alternatively, $R^1$ and $R^2$, $R^3$ and $R^4$, $R^5$ and $R^6$, $R^7$ and $R^8$, $R^9$ and $R^{10}$, and $R^{11}$ and $R_{12}$ are individually bonded to form any one of an aromatic ring, a heterocyclic ring, and an alicyclic ring. In this case, the bond of $R^1$ and $R^2$, the bond of $R^3$ and $R^4$, the bond of $R^5$ and $R^6$, the bond of $R^7$ and $R^8$, the bond of $R^9$ and $R^{10}$, and the bond $R^{11}$ and $R^{12}$ are independent of one another. For example, $R^3$ to $R^{12}$ may be individually hydrogen or a substituent while $R^1$ and $R^2$ are bonded to be any one ring of an aromatic ring, a heterocyclic ring, and an alicyclic ring. In addition, the aromatic ring may further have another condensed aromatic ring, and each of the aromatic ring, the heterocyclic ring, and the alicyclic ring may have a substituent such as an oxo group, or an alkyl group having 1 to 6 carbon atoms.

In the general formula (1), $X^1$ to $X^3$ are individually any group of formulas (2) to (7).

(2)

(3)

(4)

(5)

(6)

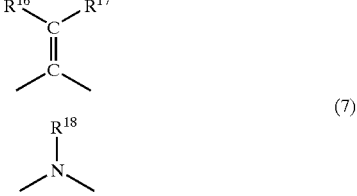

(7)

In the group represented by the formula (2), $R^{13}$ and $R^{14}$ may be individually any one of hydrogen, an alkyl group having 1 to 6 carbon atoms, an aryl group having 6 to 30, preferably 6 to 14 carbon atoms, a heterocyclic ring having 2 to 18, preferably 2 to 10 carbon atoms. In this case, each of the aryl group and the heterocyclic group may have a substituent. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur. Alternatively, $R^{13}$ and $R^{14}$ may be bonded to an alicyclic ring having 3 to 10, preferably 6 carbon atoms.

In the group represented by the formula (5), $R^{15}$ is any one of hydrogen, an aryl group having 6 to 30, preferably 6 to 14 carbon atoms, and a heterocyclic group having 2 to 18, preferably 2 to 10 carbon atoms. In this case, the aryl group may have one or more of substituents such as an alkyl group having 1 to 6 carbon atoms, an acyl group having 1 to 6 carbon atoms, a halogeno group, and an oxo group, or may be unsubstituted. It is preferable that the heterocyclic ring has a monocyclic structure of a five- or six-membered ring, or a polycyclic structure including any one or both of a five-membered ring and six-membered ring, and includes any atom of nitrogen, oxygen, and sulfur.

In the group represented by the formula (6), $R^{16}$ and $R^{17}$ are individually any one of halogen, an aryl group having 6 to 30, a heterocyclic group having 2 to 18, preferably 2 to 10 carbon atoms, and a cyano group. In this case, the aryl group may have one or more of substituents such as an alkyl group having 1 to 6 carbon atoms, a halogeno group, and an aryl group having 6 to 30, preferably 6 to 14 carbon atoms, or may be unsubstituted. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur.

In the group represented by the formula (5), $R^{18}$ is any one of hydrogen, an alkyl group having 1 to 6 carbon atoms, an aryl group having 6 to 30, preferably 6 to 14 carbon atoms, and a heterocyclic group having 2 to 18, preferably 2 to 10 carbon atoms. In this case the aryl group may have a substituent such as a dialkylamino group. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur.

Of triazine derivatives represented by the general formula (1), triazine derivatives represented by the following general formula (8) to (12) are particularly preferable.

(8)

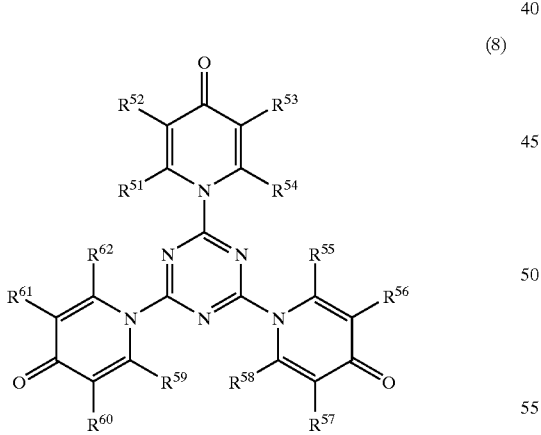

In the general formula (8), $R^{51}$ to $R^{62}$ are individually any one of hydrogen, an alkyl group, an alkoxy group, a halogeno group, an acyl group, an alkoxycarbonyl group, an aryl group, and a hetero cyclic ring, or $R^{51}$ and $R^{52}$, $R^{53}$ and $R^{54}$, $R^{55}$ and $R^{56}$, $R^{57}$ and $R^{58}$, $R^{59}$ and $R^{60}$, and $R^{61}$ and $R^{62}$ are individually bonded to form any one of an aromatic ring, a heterocyclic ring, and an alicyclic ring. In this case, the bond of $R^{51}$ and $R^{52}$, the bond of $R^{53}$ and $R^{54}$, the bond of $R^{55}$ and $R^{56}$, the bond of $R^{57}$ and $R^{58}$, the bond of $R^{59}$ and $R^{60}$, and the bond $R^{61}$ and $R^{62}$ are independent of one another.

(9)

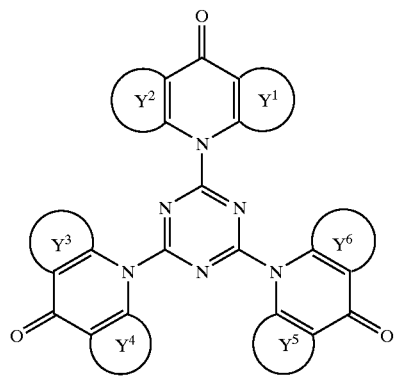

In the general formula (1), $Y^1$ to $Y^6$ are individually any one of an aromatic ring, a heterocyclic ring, and an alicyclic ring.

(10)

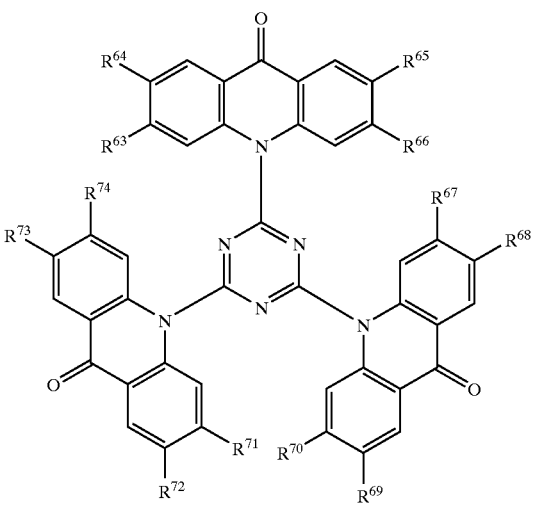

In the general formula (10), $R^{63}$ to $R^{74}$ are individually any one of hydrogen, an oxo group, and an alkyl group. It is preferable that the alkyl group has 1 to 6 carbon atoms.

(11)

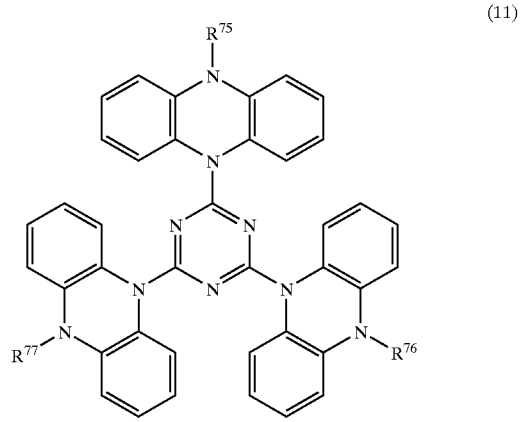

In the general formula (11), $R^{75}$ to $R^{77}$ are individually any one of hydrogen, an aryl group, and a heterocyclic group. It is preferable that the aryl group has 6 to 30 carbon atoms, more preferably 6 to 14 carbon atoms. It is preferable that the heterocyclic group has 2 to 18 carbons, more preferably 2 to 10 atoms.

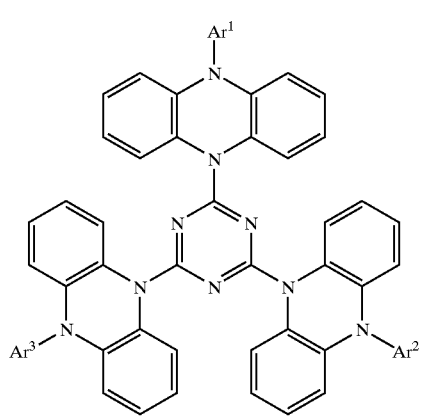

(12)

In the general formula (12), $Ar^1$ to $Ar^3$ are individually an aryl group. It is preferable that the aryl group has 6 to 30 carbon atoms, more preferably 6 to 14 carbon atoms. The aryl group may have a substituent.

Triazine derivatives according to the present invention are 2,4,6-tris (9-oxo-10(9H)-acridinyl)-1,3,5-triazine, 2,4,6-tris (9-oxo-12 (7H)-benzo [a]acridinyl)-1,3,5-triazine, 2,4,6-tris (2-chloro-9-oxo-10(9H)-acridinyl)-1,3,5-triazine, 2,4,6-tris (3-methoxy-9-oxo-10(9H)acridinyl)-1,3,5-triazine, 2,4,6-tris(2-methoxy-9-oxo-10(9H)-acridinyl)-1,3,5-triazine, 2,4, 6-tris(10-phenyl-dihydrophenazine-5-ly)-1,3,5-triazine, 2,4, 6-tris(10-phenyl-benzo[a]dihydrophenazine-5-yl)-1,3,5-triazine, 2,4,6-tris(10-phenyl-dibenzo[a,c] dihydrophenazine-5-yl)-1,3,5-triazine, 2,4,6-tris(10-phenyl-dibenzo[a,i]dihydrophenazine-5-yl)-1,3,5-triazine, 2,4,6-tris (10-methyl-dihydrophenazine-5-yl)-1,3,5-triazine, 2,4,6-tris [10-(4 -dimethylamino)phenyl-dihydrophenazine- 5-yl]-1,3, 5-triazine, 2,4,6-tris[10-(2-pyridyl)-dihydrophenazine-5-yl]-1,3,5-triazine, 2,4,6-tris[10-(2-thienyl)-dihydrophenazine-5-yl]-1,3,5-triazine, 2,4,6-tris[10-(1-naphthyl)-dihydrophenazine-5-yl]-1,3,5-triazine, 2,4,6-tris [9-(phenylimino)-10(9H)-acridinyl]-1,3,5-triazine, 2,4,6-tris[9-(1-naphthylimino)-10(9H)-acridinyl]-1,3,5-triazine, 2,4,6-tris[9-(1-anthryl)-10(9H)-acridinyl]-1,3,5-triazine, 2,4,6-tris[9-(fluorophenylimino)-10(9H)-acridinyl]-1,3,5-triazine, 2,4,6-tris[9-(methoxyphenylimino)-10(9H)-acridinyl]-1,3,5-triazine, 2,4,6-tris[9-(tolylimino)-10(9H)-acridinyl]-1,3,5-triazine, 2,4,6-tris[9-N-{1,8-naphthal anhydride-4-yl}imino-10(9H)-acridinyl]-1,3,5-triazine, 2,4,6-tris[9-(pyridylimino)-10(9H)-acridinyl]-1,3,5-triazine, 2,4,6-tris [9-N-(1,3-benzothiazole-2-yl)imino-10(9H)-acridinyl]-1,3, 5-triazine, 2,4,6-tris(9-benzylidene-10(9H)-acridinyl)-1,3,5-triazine, 2,4,6-tris[9-(2-naphthylidene)-10(9H)-acridinyl]-1, 3,5-triazine, 2,4,6-tris[9-(anthracene-9-ylidene)-10(9H)-acridinyl]-1,3,5-triazine, 2,4,6-tris[9-(diphenylmethylidene)-10(9H)-acridinyl]-1,3,5-triazine, 2,4,6-tris[9-(2-biphenylidene)-10(9H)-acridinyl]-1,3,5-triazine, 2,4,6-tris[9-(methylbenzilidene)-10(9H)-acridinyl]-1, 3,5-triazine, 2,4,6-tris[9-(fluorobenzilidene)-10(9H)-acridinyl]-1,3,5-triazine, 2,4,6-tris[9-(2-pyridilidene)-10(9H)-acridinyl]-1,3,5-triazine, 2,4,6-tris[9-(2-thienylidene)-10 (9H)-acridinyl]-1,3,5-triazine, 2,4,6-tris(9,9-diphenyl-9, 10-dihydro-9-acridinyl)-1,3,5-triazine, 2,4,6-tris[9-(dicyanomethylidene)-10(9H)-acridinyl]-1,3,5-triazine, 2,4,6-tris (3-methoxy-4 (1H)-pyridinone-1-yl)-1,3,5-triazine, 2,4,6-tris(3,4-dicyano-2,6-dimethyl-4 (1H)-pyridinone-1-yl)-1,3, 5-2,4,6-tris(2,6-dimethoxycarbonyl-4 (1H)-pyridinone-1-yl)-1,3,5-triazine, 2,4,6-tris[2,6-bis(2-pyridyl)-4(1H)-pyridinone-1-yl]-1,3,5-triazine, 2,4,6-tris(3,5-diacetyl-2,6-dimethyl-1,4-dihydropyridine-1-yl)-1,3,5-triazine, 2,4,6-tris (3,5-diethoxycarbonyl-2,6-dimethyl-1,4-dihydropyridine-1-yl)-1,3,5-triazine, 2,4,6-tris[3,3,6,6-tetramethyl- 3,4,6,7,9, 10-hexahydro-1,8 (2H,5H)-acridinedione-10-yl]-1,3,5-triazine, 2,4,6-tris(3,5-dicyano-2,4,4,6-tetaramethyl-1,4-dihydropyridine-1-yl)-1,3,5-triazine, 2,4,6-tris(1,5-dicyano-2,4-dimethyl-3-azaspiro[5,5]undeca-1,4-diene-1-yl)-1,3,5-triazine, 2,4,6-tris(3,5-dicyano-2,6-dimethyl-4-phenyl-1,4-dihydropyridine-1-yl)-1,3,5-triazine, 2,4,6-tris[3,5-dicyano-4-(2-furyl)-2,6-dimethyl-1,4-dihydropyridine-1-yl]-1,3,5-triazine, 2,4,6-tris[3,5-dicyano-2,6-dimethyl-4-(3-pyridyl)-1,4-dihydropyridine-1-yl]-1,3,5-triazine, 2,4,6-tris[3,5-dicyano-2,6-dimethyl-4-(2-thienyl)-1,4-dihydropyridine-1-yl]-1,3,5-triazine, 2,4,6-tris[9-isopropyl-3,4,6,7,9,10-hexahydro-1,8(2H,5H)-acridinedione-1-yl]-1,3,5-triazine, and 2,4,6-tris{8-phenyl-5,8-dihydro-1H,3H-difuro[3,4-b:3, 4-e]pyridine-1,7(4H)-dione-1-yl}-1,3,5-triazine.

A light-emitting element according to the present invention has a layer including a triazine derivative according to the present invention between a pair of electrodes.

A light-emitting element according to the present invention has a layer including a triazine derivative according to the present invention and a luminescent material that has an emission wavelength in the wavelength range of 400 to 500 nm between a pair of electrodes.

A light-emitting device according to the present invention has a light-emitting element that has a layer including a triazine derivative according to the present invention between a pair of electrodes.

According to the present invention, a novel material for manufacturing a light-emitting element can be obtained. Therefore, the range of material choices is expanded when a light-emitting element is manufactured. In addition, a light-emitting element that operates at a lower driving voltage can be obtained by using a triazine derivative according to the present invention. In addition, a light-emitting element that is able to show a luminescent color closer to a luminescent color derived from a luminescent material can be obtained by using a triazine derivative according to the present invention. In addition, a light-emitting device that is able to display images that have favorable color reproducibility can be obtained by applying a light-emitting element including a triazine derivative according to the present invention to a pixel.

DETAILED DESCRIPTION OF THE INVENTION

Figure 1:
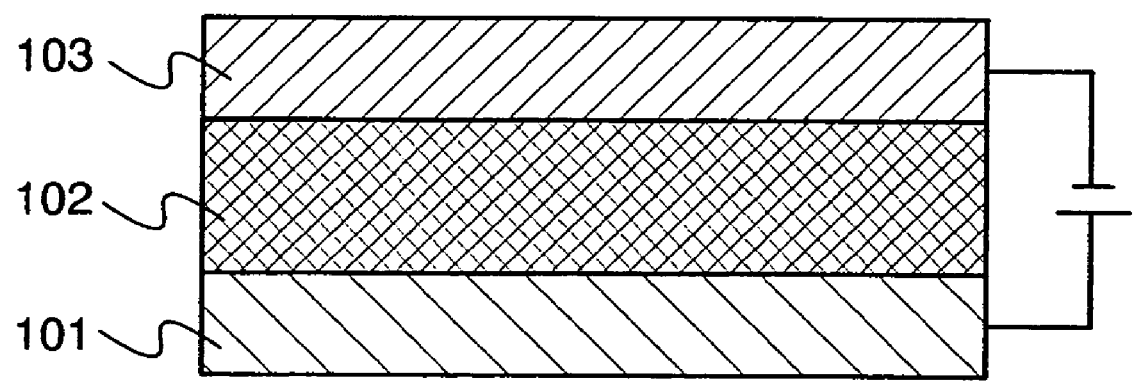
FIG. 1 is a diagram illustrating an example of a light-emitting element according to the present invention.

Embodiments of the present invention will be described below with reference to the drawings and the like. However, the present invention may be embodied in a lot of different forms, and it is to be easily understood that various changes and modifications will be apparent to those skilled in the art unless such changes and modifications depart from the scope of the present invention. Therefore, the present invention is not to be construed with limitation to what is described in the embodiments.

(Embodiment 1)

One example of a triazine derivative according to the present invention is represented by a general formula (13).

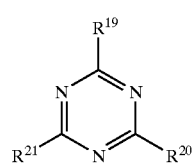

(13)

In the general formula (13), $R^{19}$ to $R^{21}$ are individually any one of groups represented by formulas (14) to (20).

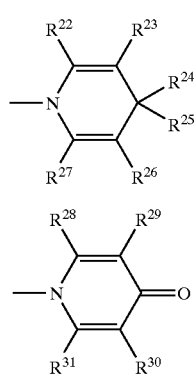

(14)

(15)

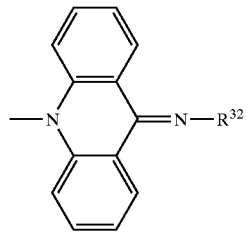

(16)

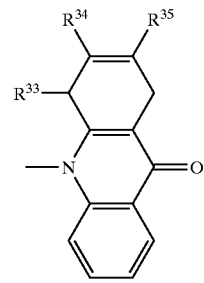

(17)

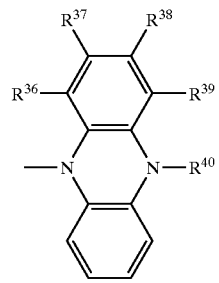

(18)

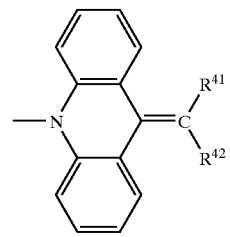

(19)

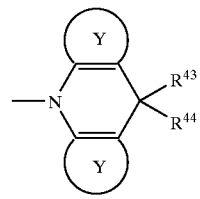

(20)

In the group represented by the formula (14), $R^{24}$ and $R^{25}$ are individually any one of hydrogen, an alkyl group having 1 to 6 carbon atoms, an aryl group having 6 to 30, preferably 6 to 14 carbon atoms, and a heterocyclic group having 2 to 18, preferably 2 to 10 carbon atoms. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur. Alternatively, $R^{24}$ and $R^{25}$ are bonded to form an alicyclic ring having 3 to 10, preferably 6 carbon atoms.

$R^{22}$ to $R^{27}$ are individually any one of hydrogen, an alkyl group having 1 to 6 carbon atoms, an alkoxy group having 1 to 6 carbon atoms, a halogeno group, an acyl group having 1 to 6 carbon atoms, an alkoxycarbonyl group having 1 to 6 carbon atoms, a cyano group, an aryl group having 6 to 30, preferably 6 to 14 carbon atoms, and a heterocyclic group having 2 to 18, preferably 2 to 10 carbon atoms. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur. Alternatively, $R^{22}$ and $R^{23}$, and $R^{26}$ and $R^{27}$ are individually bonded to form an alicyclic ring having 3 to 10, preferably 6 carbon atoms.

In the group represented by the formula (15), $R^{28}$ to $R^{31}$ are individually any one of hydrogen, an alkyl group having 1 to 6 carbon atoms, an alkoxy group having 1 to 6 carbon atoms, a halogeno group, an acyl group having 1 to 6 carbon atoms, an alkoxycarbonyl group having 1 to 6 carbon atoms, an aryl group having 6 to 30, preferably 6 to 14 carbon atoms, and a heterocyclic group having 2 to 18, preferably 2 to 10 carbon atoms. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur.

In the group represented by the formula (16), $R^{32}$ is any one of an aryl group having 6 to 30, preferably 6 to 14 carbon atoms, and a heterocyclic group having 2 to 18, preferably 2 to 10 carbon atoms. The aryl group may have a substituent such as an alkyl group having 1 to 6 carbon atoms, an alkoxy group having 1 to 6 carbon atoms, an acyl group having 1 to 6 carbon atoms, an alkoxycarbonyl group having 1 to 6 carbon atoms, or a halogeno group, or may be unsubstituted. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur. In addition, the aryl group and heterocyclic group may have another condensed aromatic ring or heterocyclic group.

In the group represented by the formula (17), $R^{33}$ to $R^{35}$ may be individually any one of hydrogen, an alkyl group having 1 to 6 carbon atoms, an alkoxy group having 1 to 6 carbon atoms, an acyl group having 1 to 6 carbon atoms, an alkoxycarbonyl group having 1 to 6 carbon atoms, and a halogeno group, or $R^{33}$ and $R^{34}$ may be bonded to be an aromatic ring. In addition, the aromatic ring may include a substituent such as an oxo group.

In the group represented by the formula (18), $R^{36}$ to $R^{39}$ are individually hydrogen, or $R^{36}$ and $R^{37}$, and $R^{38}$ and $R^{39}$ are individually bonded to form an aromatic ring. The bond of $R^{36}$ and $R^{37}$ and the bond of $R^{38}$ and $R^{39}$ are independent of one another. In addition, $R^{40}$ is any one of an alkyl group having 1 to 6 carbon atoms, an aryl group having 6 to 30, preferably 6 to 14 carbon atoms, and a heterocyclic group having 2 to 18, preferably 2 to 10 carbon atoms. The aryl group may have a substituent such as a dialkylamino group, or may be unsubstituted. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur.

In the group represented by the formula (19), $R^{41}$ and $R^{42}$ any one of hydrogen, an aryl group having 6 to 30, preferably 6 to 14 carbon atoms, and a heterocyclic group having 2 to 18, preferably 2 to 10 carbon atoms, and a cyano group. The aryl group may have a substituent such as an alkyl group having 1 to 6 carbon atoms, an aryl group having 6 to 30, preferably 6 to 14 carbon atoms, or a halogeno group, or may be unsubstituted. In addition, it is preferable that the heterocyclic ring has a monocyclic structure of a five- or six-membered ring, or a polycyclic structure including any one or both of a five-membered ring and a six-membered ring, and includes any atom of nitrogen, oxygen, and sulfur.

In the group represented by the formula (20), Y is any one of an aromatic ring, a heterocyclic ring, and an alicyclic ring. The aromatic ring may have a substituent such as an oxo group, or may be unsubstituted. In addition, it is preferable that the heterocyclic ring has a monocyclic structure of a five- or six-membered ring, or a polycyclic structure including any one or both of a five-membered ring and six-membered ring, and includes any atom of nitrogen, oxygen, and sulfur. $R^{43}$ and $R^{44}$ are individually any one of hydrogen, an aryl group having 6 to 30, preferably 6 to 14 carbon atoms, a heterocyclic group having 2 to 18, preferably 2 to 10 carbon atoms, and an alkyl group having 1 to 6 carbon atoms. It is preferable that the heterocyclic ring has a monocyclic structure of a five- or six-membered ring, or a polycyclic structure including any one or both of a five-membered ring and a six-membered ring, and includes any atom of nitrogen, oxygen, and sulfur. Alternatively, $R^{43}$ and $R^{44}$ are bonded to form an alicyclic ring having 3 to 10, preferably 6 carbon atoms.

Structure formulas (21) to (70) show specific examples of the groups represented by the formula (14) to (20).

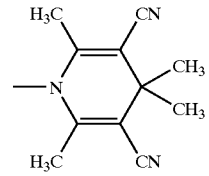

(21)

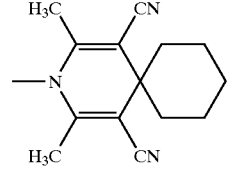

(22)

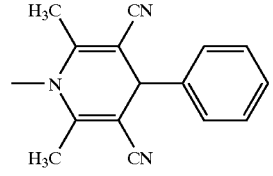

(23)

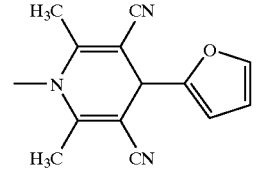

(24)

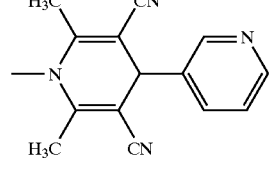

(25)

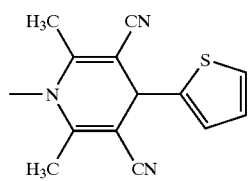
(26)
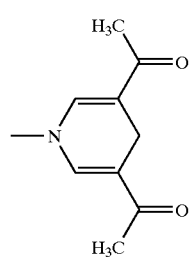
(27)
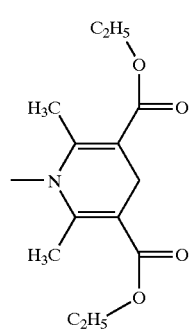
(28)
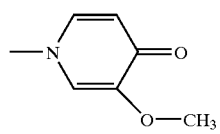
(29)
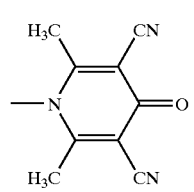
(30)
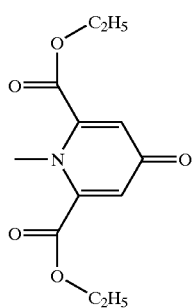
(31)
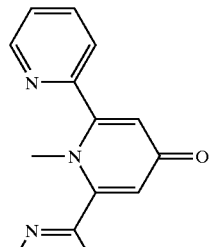
(32)
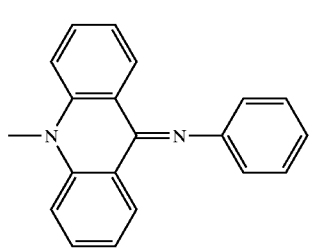
(33)
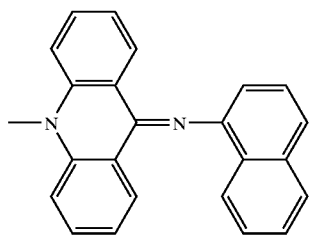
(34)
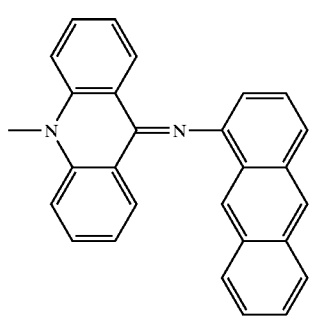
(35)
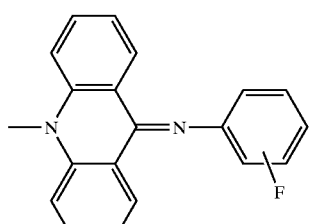
(36)
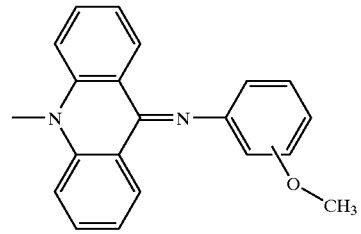
(37)

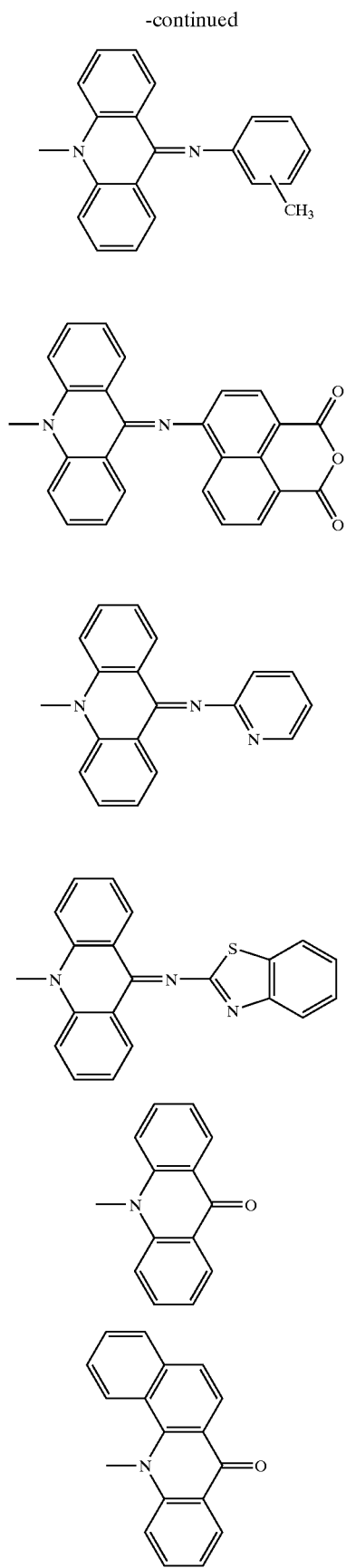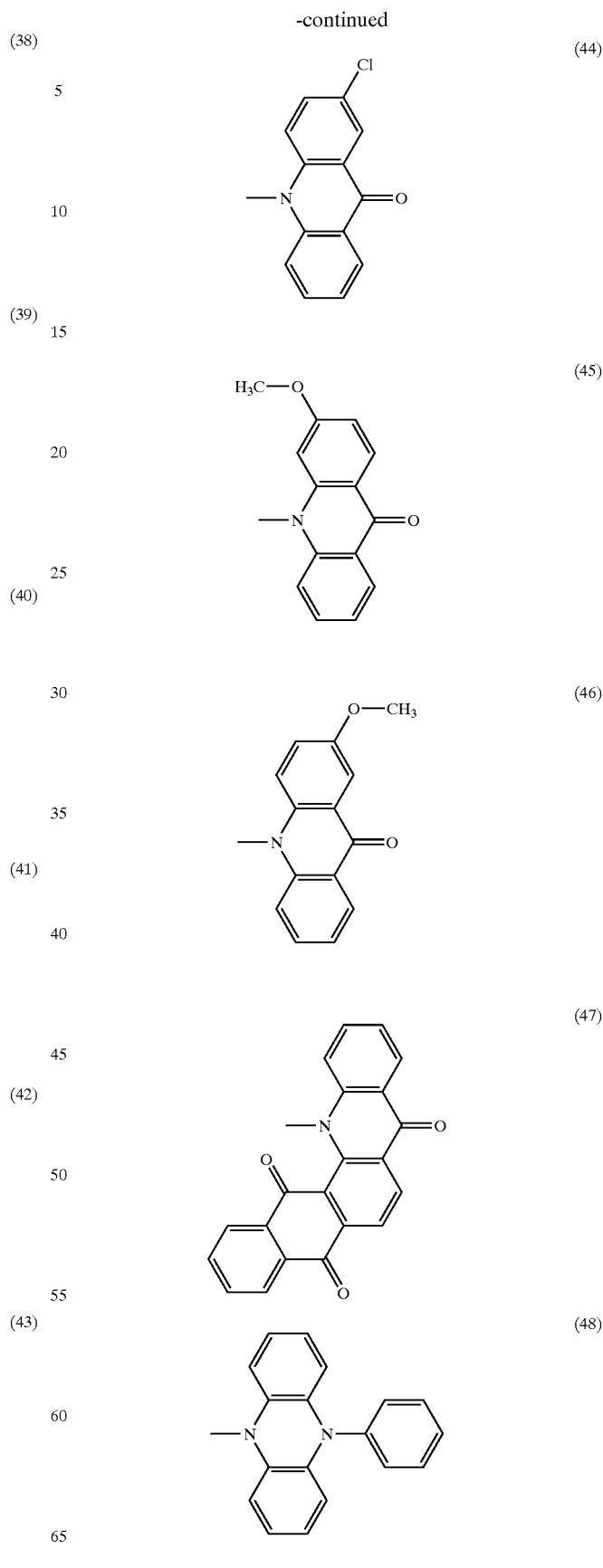

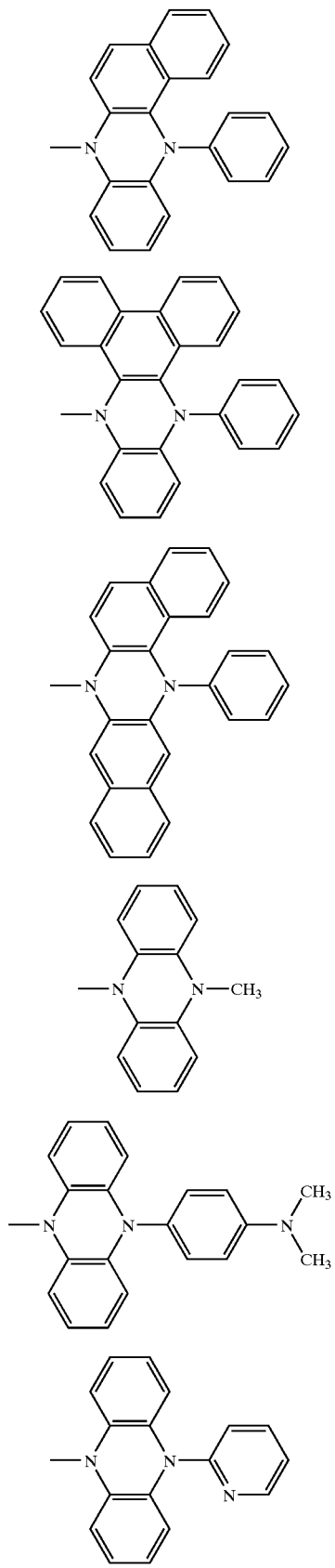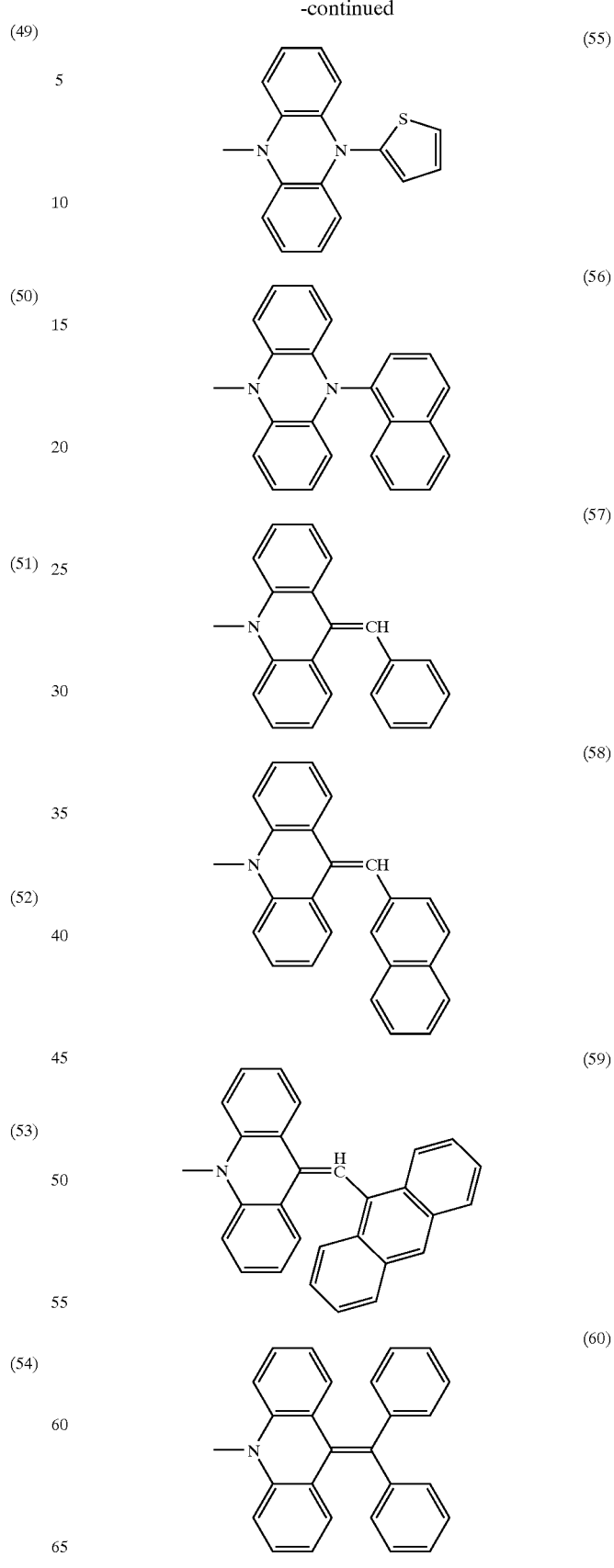

-continued

(61) 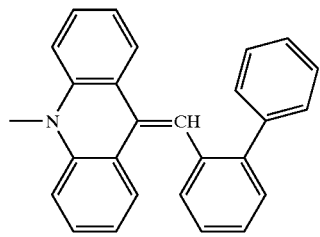

(62) 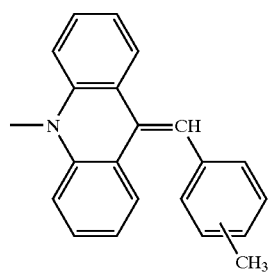

(63) 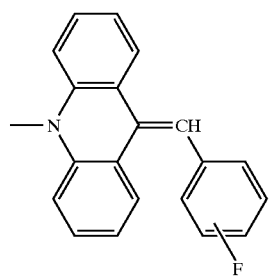

(64) 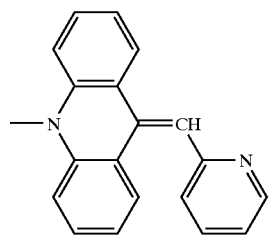

(65) 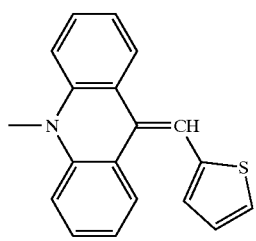

(66) 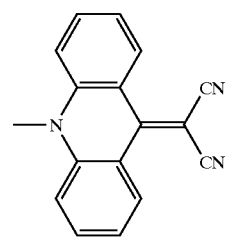

-continued

(67) 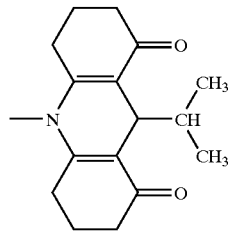

(68) 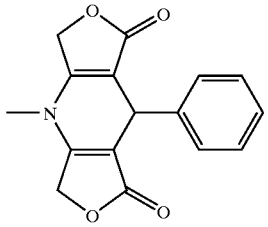

(69) 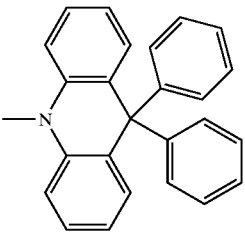

(70) 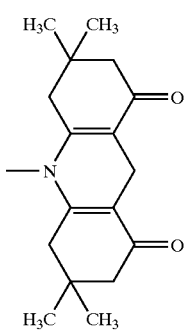

The triazine derivatives described above can be used as a material for manufacturing a light-emitting element. In this way, a novel material for manufacturing a light-emitting element can be obtained.

(Embodiment 2)

A light-emitting element to which a triazine derivative according to the present invention is applied will be described in FIG. 1.

The light-emitting element shown in FIG. 1 has a layer 102 including a luminescent material between a first electrode 101 and a second electrode 103. A hole injected from the first electrode 101 to the layer 102 including the luminescent material and an electron injected from the second electrode 103 to the layer 102 including the luminescent material are recombined in the layer 102 including the luminescent material to form an exciton, and light is emitted when the exciton returns to the ground state. Namely, in the light-emitting element shown in the present embodiment, the first electrode 101 and the second electrode 103 serve as an anode and a cathode, respectively.

In the present invention, the luminescent material is a material that has a favorable luminous efficiency and is able to emit light with a desired emission wavelength. For example, when blue or bluish is required to be obtained, a material that has a favorable luminous efficiency and has a peak of an emission spectrum in the wavelength range of 400 to 500 nm, such as anthracene derivatives such as 9,10-diphenylanthracene, pyrene derivatives such as 1,3,6,8-tetraphenylpyrene, perylene and derivatives thereof, corresponds to the luminescent material.

Although there is no particular limitation on the first electrode 101, it is preferable that the first electrode 101 is formed by using a material that has a larger work function when the first electrode 101 functions as an anode as in the present embodiment. Specifically, in addition to indium tin oxide including silicon oxide and indium oxide including zinc oxide at 2 to 20%, gold (Au), platinum (Pt), nickel (Ni), tungsten (W), chromium (Cr), molybdenum (Mo), iron (Fe), cobalt (Co), copper (Cu), palladium (Pd), and the like can be used. The first electrode 101 can be formed by, for example, sputtering or evaporation.

Although there is no particular limitation on the second electrode 103, it is preferable that the second electrode 103 is formed by using a material that has a smaller work function when the second electrode 103 functions as a cathode as in the present embodiment. Specifically, aluminum containing an alkali metal or an alkali-earth metal such as lithium (Li) or magnesium, and the like can be used. The second electrode 103 can be formed by, for example, sputtering or evaporation.

The layer 102 including the luminescent material is composed of a single layer or a lamination layer, for example, by combining a layer including a luminescent material and a material that makes carrier transport easily, so that a region in which carriers are recombined is formed at a point distant from the first electrode 101 and the second electrode 103.

The layer 102 including the luminescent material includes at least one layer including a triazine derivative according to the present invention. There is no particular limitation on the layer including the triazine derivative according to the present invention, which may include only the triazine derivative according to the present invention or include also another material. As described above, by including the triazine derivative according to the present invention, carriers injected from any one or both of the first electrode 101 and the second electrode 103 can be transported efficiently into the region in which carriers are recombined.

In addition to the layer including the triazine derivative according to the present invention, the layer 102 including luminescent material may include one or more layers including a material selected from materials such as aromatic amine compounds (that is, compounds including the bond of a benzene ring-nitrogen), for example, 4,4'-bis[N-(1-naphthyl)-N-phenyl-amino]-biphenyl (abbreviation: α-NPD), 4,4'-bis[N-(3-methylphenyl)-N-phenyl-amino]-biphenyl (abbreviation: TPD), 4,4',4"-tris(N,N-diphenyl-amino)-triphenylamine (abbreviation: TDATA), and 4,4',4"-tris[N-(3-methylphenyl)-N-phenyl-amino]-triphenylamine (abbreviation: MTDATA), and metal complexes including a quinoline skeleton or a benzoquinoline skeleton, for example, tris(8-quinolinolato) aluminum (abbreviation: $Alq_3$), tris(5-methyl-8-quinolinolato) aluminum (abbreviation: $Almq_3$), bis(10-hydroxybenzo[h]quinolinato beryllium (abbreviation: $BeBq_2$), and bis(2-methyl-8-quinolinolato)-4-phenyl-phenolato-aluminum(abbreviation: BAlq).

The layer 102 including the luminescent material may further include a layer including a material that is able to help injection of carriers from the first electrode 101 or the second electrode 103 into the layer 102 including the luminescent material. There is no particular limitation on this material, which is able to help injection of carriers from the electrode into the layer 102 including the luminescent material, and which includes phthalocyanine compounds such as phthalocyanine (abbreviation: $H_2Pc$) and copper phthalocyanine (abbreviation: CuPc), metal oxides as molybdenum oxide (MoOx), vanadium oxide (VOx), ruthenium oxide (RuOx), tungsten oxide (WOx), and manganese oxide (MnOx), and compounds containing an alkali metal or an alkali-earth metal such as lithium fluoride (LiF), cesium fluoride (CsF), and calcium fluoride ($CaF_2$).

In the layer 102 including the luminescent material, it is preferable that the luminescent material is included in a layer in which the region in which a hole injected from the first electrode 101 and an electron injected from the second electrode 103 are recombined is formed.

When a luminescent material that has an emission wavelength in the wavelength range of 400 to 500 nm, preferably 450 to 500 nm, it is preferable that the luminescent material is included in the layer including the triazine derivative according to the present invention. This makes it possible to obtain a light-emitting element that is able to show a luminescent color closer to a luminescent color derived from the luminescent material.

There is no particular limitation on the luminescent material. 4-dicyanomethylene-2-methyl-6-(1,1,7,7-tetramethyl-julolidyl-9-enyle)-4H-pyrane (abbreviation:DCJT), 4-dicyanomethylene-2-t-buthyl-6-(1,1,7,7-tetramethyljulolidyl-9-enyle)-4H-pyrane (abbreviation: DPA), periflanthene, 2,5-dicyano-1,4-bis(10-methoxy-1,1,7,7-tetramethyljulolidyl-9-enyle)benzene, N,N'-dimethylquinacridone(abbreviation: DMQd), coumarin 6, coumarin 545T, tris (8-quinolinolato) aluminum(abbreviation: $Alq_3$), 9,9'-bianthryl, 9,10-diphenylanthracene (abbreviation: DPA), 9,10-bis(2-naphthyl) anthracene (abbreviation: DNA), and the like can be used.

In addition, as the luminescent material, which has an emission wavelength in the wavelength range of 400 to 500 nm, there are 9,10-diphenylanthracene, 9,10-di-2-naphthylanthracene, 1,5-bis (diphenylamino) naphthalene, perylene, coumarin 30,1,1,4,4-tetraphenylbutadinene, styrylarylenes, styrylamines, and the like.

(Embodiment 3)

An example of a light-emitting element that is manufactured with the use of a triazine derivative according to the present invention and shows luminescence from an excited triplet state will be described with reference to FIG. 9.

Figure 9:
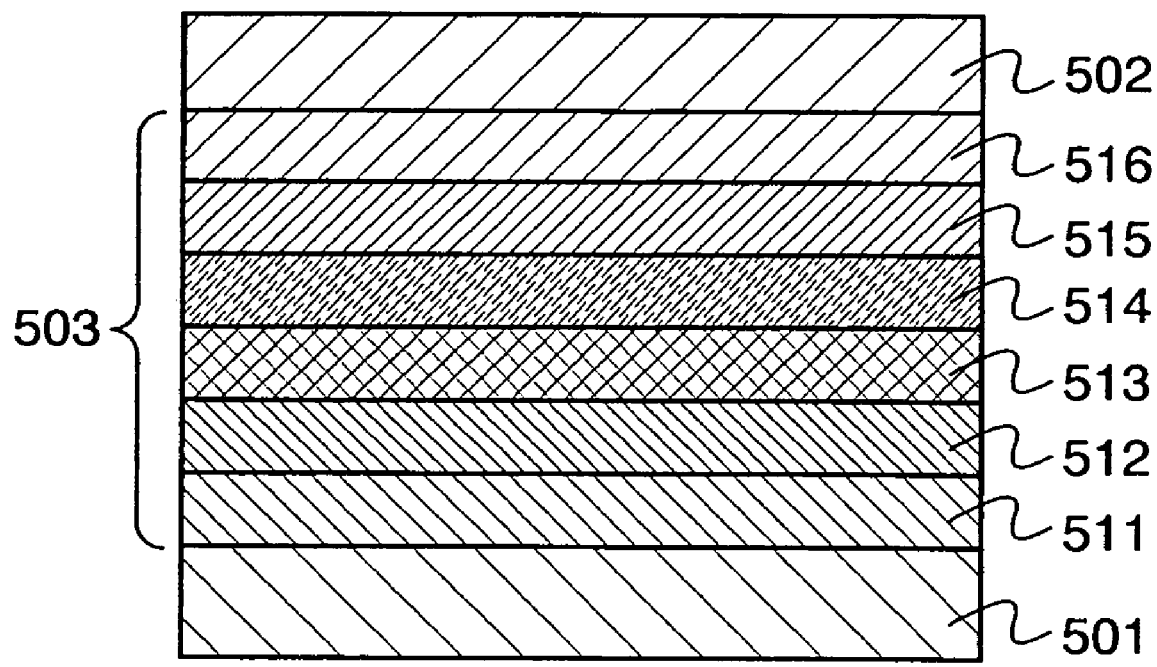
FIG. 9 is a diagram illustrating an example of a light-emitting element according to the present invention.

In FIG. 9, a layer 503 including a luminescent material is provided between a first electrode 501 and a second electrode 502. The layer 503 including the luminescent material has a multilayer structure, and includes a hole injecting layer 511, a hole transporting layer 512, a light-emitting layer 513, a blocking layer 514, an electron transporting layer 515, and an electron injecting layer 516. When a voltage is applied so that the potential of the first electrode 501 is higher than the potential of the second electrode 502, current flows, an electron and a hole are recombined in the light-emitting layer 513 to generate excitation energy, and light is emitted when the excited luminescent material returns to the ground state.

Here, a luminescent material that is capable of showing luminescence from an excited triplet state is included in the light-emitting layer 513. There is no particular limitation on such a luminescent material as this. However, an organometallic complex that has a structure in which a metal is coordinated by an organic compound, such as bis {2-(p-tolyl)pyridinato-N, $C^{2'}$}(acethylacetonato) iridium (III) (abbreviation: $Ir(tpy)_2(acac)$), bis{2-(2'-benzothienyl)pyridinato}(acethylacetonato) iridium (III) (abbreviation: Ir(btp)$_2$(acac)), bis{2-(4,6-difluorophenyl)pyridinato-N, C$^{2'}$}(picolinato) iridium (III) (abbreviation: FIrpic), and bis(2-phenylpyridinato-N, C$^{2'}$) (acethylacetonato) iridium (III) (abbreviation: Ir(ppy)$_2$(acac)), is preferable. In addition to the luminescent material, it is preferable that a material that has a larger energy gap than the luminescent material has be included in the light-emitting layer 513. Further, it is preferable that the luminescent material is included such that the luminescent material is dispersed in a layer composed of the material that has the larger energy gap than the luminescent material. There is no particular limitation on the material that has the larger energy gap than the luminescent material has, and 4,4'-bis(N-carbazolyl)-biphenyl (abbreviation: CBP), 1,4-di(triphenylsilyl)benzne, bathocuproin (abbreviation: BCP), Alq$_3$, BAlq, 4,4'-bis[N-(1-naphthyl)-N-phenylamino]-biphenyl (abbreviation: NPB), and the like can be used.

There is no particular limitation on the first electrode 501 and the second electrode 502. However, it is preferable any one or both of the first electrode 501 and the second electrode 502 be formed so that visible light can be transmitted. Specifically, it is preferable that any one or both of the first electrode 501 and the second electrode 502 be a so-called transparent electrode composed of indium tin oxide, indium oxide including silicon, indium zinc oxide, or the like, or an electrode including a conductor such as aluminum or silver and formed to be several nm in thickness. When it is not necessary to transmit visible light, it is possible to use an electrode formed to be thicker than several nm with the use of a conductor such as aluminum, gold, silver, titanium, titanium nitride, tantalum, or tantalum nitride.

Further, the hole transporting layer 512 has a function of transporting a hole injected from the first electrode 501 side toward the light-emitting layer 513. By providing the hole transporting layer 512 to extend the distance between the first electrode 501 and the light-emitting layer 513 in this way, luminescence in the light-emitting layer 513 can be prevented from quenching due to a metal included in the first electrode 501. It is preferable that the hole transporting layer 512 be formed with the use of a highly hole transporting material, in particular, with the use of a material that has a hole mobility of 1×10$^{-6}$ cm$^2$/Vs or more. It is to be noted that a highly hole transporting material indicates a material in which a mobility of a hole is higher than that of an electron and the ratio of the hole mobility to the electron mobility (=hole mobility/electron mobility) is more than 100. Specific examples of materials that can be used for forming the hole transporting layer 512 include NPB, 4,4'-bis[N-(3-methylphenyl)-N-phenylamino]-biphenyl (abbreviation: TPD), 4,4',4"-tris(N,N-diphenylamino)-triphenylamine (abbreviation: TDATA), and 4,4',4"-tris[N-(3-methylphenyl)-N-phenylamino]-triphenylamine (abbreviation: MTDATA), 4,4'-bis{N-[4-(N,N-di-m-tolylamino)phenyl]-N-phenylamino}biphenyl (abbreviation: DNTPD), 1,3,5-tris[N,N-di(m-tril)amino]benzene (abbreviation: m-MTDAB), 4,4',4"-tris(N-carbazolyl)-triphenylamine (abbreviation: TCTA), copper phthalocyanine (abbreviation: CuPc), and vanadyl phthalocyanine (abbreviation: VOPC). In addition, the hole transporting layer 512 may have a laminated structure formed by combining two or more layers each including the material mentioned above.

Further, the electron transporting layer 515 has a function of transporting an electron injected from the second electrode 502 side toward the light-emitting layer 513. By providing the electron transporting layer 515 to extend the distance between the second electrode 502 and the light-emitting layer 513 in this way, luminescence in the light-emitting layer 513 can be prevented from quenching due to a metal included in the second electrode 502. It is preferable that the hole transporting layer 515 be formed with the use of a highly electron transporting material, in particular, with the use of a material that has an electron mobility of 1×10$^{-6}$ cm$^2$/Vs or more. It is to be noted that a highly electron transporting material indicates a material in which a mobility of an electron is higher than that of a hole and the ratio of the electron mobility to the hole mobility (=electron mobility/hole mobility) is more than 100. Specific examples of materials that can be used for forming the electron transporting layer 515 include 2-(4-biphenylyl)-5-(4-tert-butylphenyl)-1,3,4-oxadiazole (abbreviation: PBD), 1,3-bis[5-(p-tert-butylphenyl)-1,3,4-oxadiazole-2-yl]benzene (abbreviation: to as OXD-7), 3-(4-tert-butylphenyl)-4-phenyl-5-(4-biphenylyl)-1,2,4-triazole (abbreviation: TAZ), 3-(4-tert-butylphenyl)-4-(4-ethylphenyl)-5-(4-biphenylyl)-1,2,4-triazole (abbreviation: p-EtTAZ), bathophenanthroline (abbreviation: BPhen), BCP, and 4,4-bis (5-methylbenzoxazol-2-yl)stilbene (abbreviation: BzOs) in addition to Alq$_3$, tris (4-methyl-8-quinolinolato)aluminum (abbreviation: Almq$_3$), bis(10-hydroxybenzo [h]quinolinato)beryllium (abbreviation: BeBq$_2$), BAlq, bis[2-(2-hydroxyphenyl)-benzoxazolato]zinc (abbreviation: Zn(BOX)$_2$), and bis[2-(2-hydroxyphenyl)-benzothiazolato]zinc (abbreviation: Zn(BTZ)$_2$). In addition, the electron transporting layer 515 may have a laminated structure formed by combining two or more layers each including the material mentioned above.

Further, the hole injecting layer 511 is a layer that has a function of aiding injection of a hole from the first electrode 501 to the hole transporting layer 512. By providing the hole injecting layer 511, the difference in ionization potential between the first electrode 501 and the hole transporting layer 512 is reduced so that a hole is easily injected. It is preferable that the hole injecting layer 511 be formed with the use of a material that has an ionization potential smaller than that of the material forming the hole transporting layer 512 and larger than that of the material forming the first electrode 501 or a material that has an energy band curved when provided as a thin film of 1 to 2 nm between the hole transporting layer 512 and the first electrode 501. Specific examples of materials that can be used for forming the hole injecting layer 511 include phthalocyanine compounds such as phthalocyanine (abbreviation: H$_2$Pc) and copper phthalocyanine (abbreviation: CuPc) and polymers such as poly (ethylenedioxythiophene)/poly(styrene sulfonate) (PEDOT/PSS). Namely, the hole injecting layer 511 can be formed by selecting a material that has an ionization potential relatively smaller in the hole injecting layer 511 than in the hole transporting layer 512 from hole transporting materials.

Further, the electron injecting layer 516 is a layer that has a function of aiding injection of an electron from the second electrode 502 to the electron transporting layer 515. By providing the electron injecting layer 516, the difference in electron affinity between the second electrode 502 and the electron transporting layer 515 is reduced so that an electron is easily injected. It is preferable that the electron injecting layer 516 be formed with the use of a material that has an electron affinity larger than that of the material forming the electron transporting layer 515 and smaller than that of the material forming the second electrode 502 or a material that has an energy band curved when provided as a thin film of 1 to 2 nm between the electron transporting layer 515 and the second electrode 502. Specific examples of materials that can be used for forming the electron injecting layer 516 include inorganic materials such as an alkali metal, an alkali-earth metal, a fluoride of an alkali-earth metal, a fluoride of an alkali-earth metal, an oxide of an alkali metal, and an oxide of an alkali-earth metal. Further, in addition to inorganic materials, the materials that can be used for forming the electron transporting layer 515, such as BPhen, BCP, p-EtTAZ, TAZ, and BzOs, can also be used as a material forming the electron injecting layer 516 by selecting a material that has an electron affinity larger than that of the material to be used for forming the electron transporting layer 515 from these materials. Namely, the electron injecting layer 516 can be formed by selecting a material that has an electron affinity relatively larger in the electron injecting layer 516 than in the electron transporting layer 515 from electron transporting materials.

The blocking layer 514 is a layer that has any one or both of a function of preventing holes injected from the first electrode 501 side from flowing through the light-emitting layer 513 toward the second electrode 502 and a function of preventing excitation energy generated in the light-emitting layer 513 from moving toward the electron transporting layer 515. It is preferable that the blocking layer 514 be formed with the use of a triazine derivative according to the present invention. Since a triazine derivative according to the present invention has a larger ionization potential, holes injected from the first electrode 501 side can be prevented from flowing through the light-emitting layer 513 toward the second electrode 502. Therefore, a hole and an electron can be recombined efficiently in the light-emitting layer 513, thus, the luminous efficiency is improved. Further, since a triazine derivative according to the present invention has a larger energy gap, excitation energy generated in the light-emitting layer 513 can be prevented from moving toward the electron transporting layer 515. Therefore, decrease in luminous efficiency due to movement of excitation energy can be prevented.

Although the light-emitting element including the hole injecting layer 511 and the electron injecting layer 516 is described in the present embodiment, a hole generating layer may be provided instead of the hole injecting layer 511, or an electron generating layer may be provided instead of the electron injecting layer 516. In addition,-when a hole is efficiently injected from the first electrode 501 to the hole transporting layer 512 without providing the hole injecting layer 511, it is not always necessary to provide the hole injecting layer 511. In addition, when an electron is efficiently injected from the second electrode 502 to the electron transporting layer 515 without providing the electron injecting layer 516, it is not always necessary to provide the electron injecting layer 516. Namely, one that implements the present invention may appropriately select whether or not the hole injecting layer 511 or the electron injecting layer 516 is provided.

Here, a hole generating layer is a layer that generates holes. The hole generating layer can be formed by mixing at least one material selected from materials in which a hole has a higher mobility than an electron has and bipolar materials with a material that shows an electron-accepting property to these materials. Here, as the materials in which a hole has a higher mobility than an electron has, the same materials as the materials that can be used for forming the hole transporting layer 512 can be used. In addition, as for the bipolar materials, bipolar materials such as 2,3-bis(4-diphenylaminophenyl)quinoxaline (abbreviation: TPAQn) can be used. It is to be noted that a bipolar material indicates a material in which the ratio of the mobility of one carrier to the mobility of the other carrier is 100 or less, preferably 10 or less when the mobility of any one carrier of an electron and a hole is compared with the mobility of the other carrier. In addition, of the materials in which an electron has a higher mobility than a hole has and the bipolar materials, it is particularly preferable to use a material including triphenylamine in a skeleton. By using a material including triphenylamine in a skeleton, holes become more easily generated. In addition, as the material that shows the electron-accepting property, it is preferable to use a metal oxide such as a molybdenum oxide, vanadium oxide, ruthenium oxide, or rhenium oxide.

In addition, an electron generating layer is a layer that generates electrons. The electron generating layer can be formed by mixing at least one material selected from materials in which an electron has a higher mobility than a hole has and bipolar materials with a material that shows an electron-donating property to these materials. Here, as the materials in which an electron has a higher mobility than a hole has, the same materials as the materials that can be used for forming the electron transporting layer 515 can be used. In addition, as for the bipolar materials, the above-mentioned bipolar materials such as TPAQn can be used. In addition, as the material that shows the electron-donating property, a material selected from alkali metals and alkali-earth metals, specifically, lithium (Li), calcium (Ca), sodium (Na), potassium (Ka), magnesium (Mg), or the like can be used. In addition, at least one material selected from alkali metal oxides, alkali-earth metal oxides, alkali metal nitrides, alkali-earth metal oxides, and the like, specifically, lithium oxide ($LiO_2$), calcium oxide (CaO), sodium oxide ($Na_2O$), potassium oxide ($K_2O$), magnesium oxide (MgO), lithium fluoride (LiF), cesium fluoride (CsF), calcium fluoride ($CaF_2$), and the like, can also be used as the material that shows the electron-donating property.

As described above, by providing a layer including a triazine derivative according to the present invention to come in contact with a light-emitting layer including a luminescent material that is capable of showing luminescence from an excited triplet state, a light-emitting element from which luminescence derived from the luminescent material can be manufactured.

(Embodiment 4)

By using the light-emitting element including a triazine derivative according to the present invention as described above, a light-emitting device from which luminescence derived from a luminescent material can be obtained efficiently can be manufactured. In the present embodiment, an example of a light-emitting device using the light-emitting element for a pixel will be described. Further, in the present embodiment, an example of a light-emitting device to which active matrix driving can be applied will be particularly described. However, the driving method for a light-emitting device is not to be considered limited to one described in the present embodiment. A light-emitting device to which passive driving is applied may be adopted.

Figure 2A:
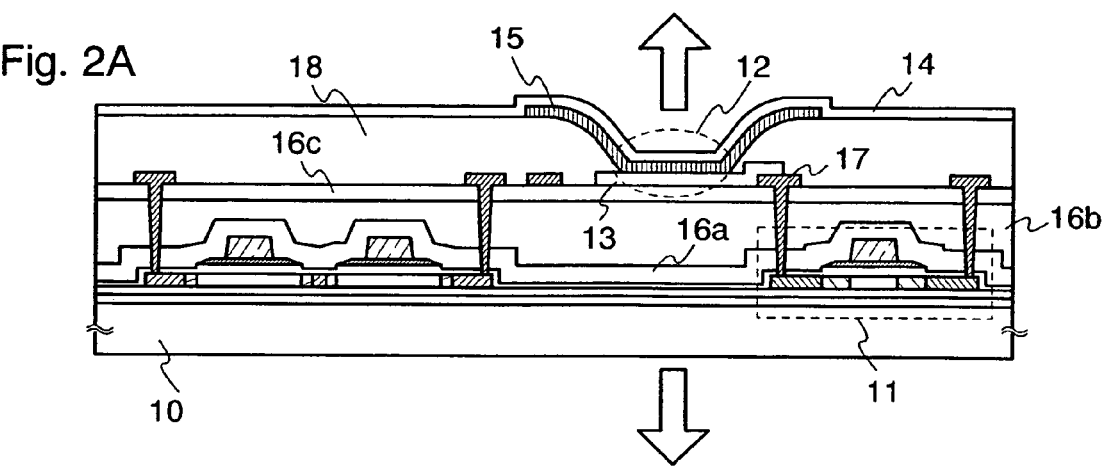
FIGS. 2A to 2C are diagrams illustrating examples of a light-emitting device according to the present invention.
Figure 2B:
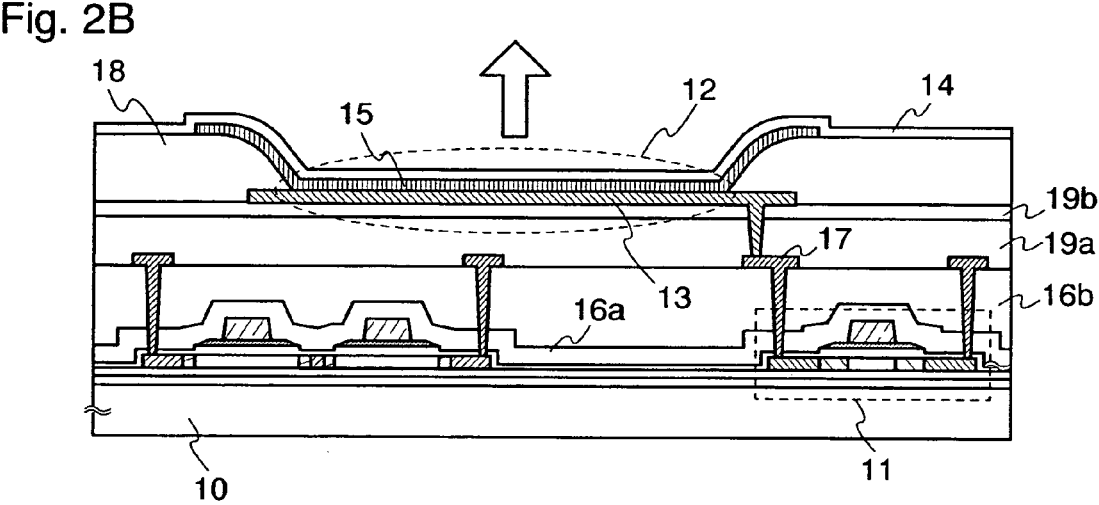
Figure 2C:
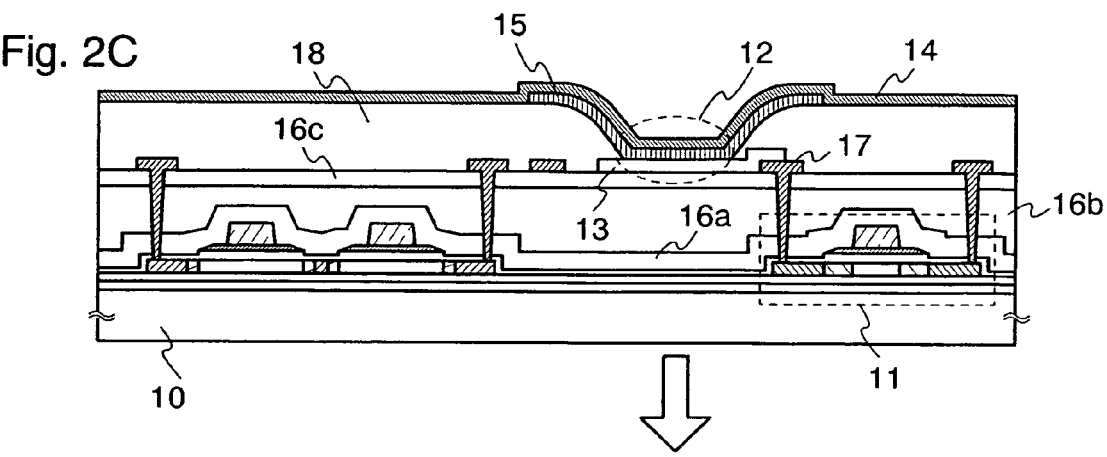

In each of FIGS. 2A to 2C, a portion surrounded by a dotted line is a transistor 11 provided for driving a light-emitting element 12 according to the present invention. The light-emitting element 12 includes a first electrode 13, a second electrode 14, and a light-emitting layer 15 sandwiched between these electrodes. The first electrode 13 and a drain of the transistor 11 are electrically connected to each other by a wiring 17 running through a first interlayer insulating film 16a to 16c. In addition, the light-emitting element 12 is separated by a partition layer 18 from another light-emitting element provided adjacently. A light-emitting device that has this structure according to the present invention is provided over substrate 10.

In the light-emitting device that has the structure described above, the light-emitting element 12 is a light-emitting element according to the present invention, and particularly, the light-emitting layer 15 includes a triazine derivative according to the present invention.

The transistor 11 is included in a top-gate type. However, the structure of the transistor 11 is not particularly limited. For example, an inversed staggered TFT may be used. In the case of an inversed staggered TFT, a TFT where a protective film is formed on a semiconductor layer that forms a channel (a channel-protection TFT) may be used, or a TFT where a portion of a semiconductor layer that forms a channel is concave (a channel-etch TFT) may be used. Here, reference numerals 21, 22, 23, 24, 25, and 26 denote a gate electrode, a gate insulating film, a semiconductor layer, an n-type semiconductor layer, an electrode, and a protective film, respectively.

In addition, a semiconductor layer forming the transistor 11 may be either crystalline or amorphous, or alternatively, may be semi-amorphous.

The following will describe a semi-amorphous semiconductor. The semi-amorphous semiconductor is a semiconductor that has an intermediate structure between amorphous and crystalline (such as single-crystal or polycrystalline) structures and has a third state that is stable in terms of free energy, which includes a crystalline region that has short range order and lattice distortion. Further, a crystal grain from 0.5 to 20 nm is included in at least a region in a film of the semi-amorphous semiconductor. A Raman spectrum of the semi-amorphous semiconductor has a shift to a lower wavenumber side than 520 cm$^{-1}$. In X-ray diffraction, diffraction peaks of (111) and (220) due to a Si crystal lattice are observed. Hydrogen or halogen is included at 1 atomic % or more in the semi-amorphous semiconductor to terminate a dangling bond. Therefore, the semi-amorphous semiconductor is also referred to as a micro-crystalline semiconductor. A nitride gas is decomposed by glow discharge (plasma CVD) to form the semi-amorphous semiconductor. As the nitride gas, in addition to $SiH_4$, a gas such as $Si_2H_6$, $SiH_2Cl_2$, $SiHCl_3$, $SiCl_4$, or $SiF_4$ can be used. This nitride gas may be diluted with $H_2$ or with $H_2$ and one kind or plural kinds of rare gas elements selected from He, Ar, Kr, and Ne, where the dilution ratio is in the range of 2:1 to 1000:1. The pressure during glow discharge is approximately in the range of 0.1 Pa to 133 Pa, and the power supply frequency is in the range of 1 MHz to 120 MHz, preferably 13 MHz to 60 MHz. The substrate heating temperature may be 300° C. or less, preferably 100 to 250° C. It is desirable to control an impurity of an atmospheric constituent such as oxygen, nitrogen, or carbon to have a concentration of $1 \times 10^{20}/cm^3$ or less as an impurity element in the film, in particular, the oxygen concentration is controlled to be $5 \times 10^{19}/cm^3$ or less, preferably $1 \times 10^{19}/cm^3$ or less. In addition, a TFT (thin film transistor) using the semi-amorphous semiconductor has a mobility of approximately 1 to 10 m$^2$/Vsec.

Further, specific examples of crystalline semiconductors for the semiconductor layer include single-crystal or polycrystalline silicon and silicon-germanium, which may be formed by laser crystallization or may be formed by crystallization with solid-phase growth using an element such as nickel.

In the case of using an amorphous material, for example, amorphous silicon to form the semiconductor layer, it is preferable that the light-emitting device has a circuit in which the transistor 11 and the other transistor (a transistor forming the circuit for driving the light-emitting element) are all n-channel transistors. Other than that case, the light-emitting device may have a circuit including one of an n-channel transistor and a p-channel transistor or may have a circuit including both an n-channel transistor and a p-channel transistor.

Further, the first interlayer insulating film 16a to 16c may be a multilayer as shown in FIGS. 9A and 9C, or may be a single layer. The first interlayer insulating film 16a includes an inorganic material such as silicon oxide or silicon nitride, and the first interlayer insulating film 16b includes a material with self-flatness such as acrylic, siloxane (a material that has a framework structure formed by the bond between silicon (Si) and oxygen (O) and includes at least hydrogen in a substituent), silicon oxide that can be used in coating deposition. In addition, the first interlayer insulating film 16c has a silicon nitride film including argon (Ar). The materials included in the respective layers are not particularly limited, and therefore materials other than the materials mentioned here may be used. Further, a layer including a material other than these materials may be combined. In this way, both of an inorganic material and an organic material, or one of an inorganic material and an organic material may be used to form the first interlayer insulating film 16.

As for the partition layer 18, it is preferable that an edge portion has a shape varying continuously in curvature radius. In addition, a material such as acrylic, siloxane, resist, or silicon oxide is used to form the partition layer 18. One or both of an inorganic material and an organic material may be used to form the partition layer 18.

In each of FIGS. 2A and 2C, only the first interlayer insulating film 16 is provided between the transistor 11 and the light-emitting element 12. However, as shown in FIG. 2B, a second interlayer insulating film 19 (19a and 19b) may be provided in addition to the first interlayer insulating film 16 (16a and 16b). In the light-emitting device shown in FIG. 2B, the first electrode 13 is connected to the wiring 17 through the second interlayer insulating film 19.

The second interlayer insulating film 19 may be a multilayer or a single layer in the same way as the first interlayer insulating film 16. The second interlayer insulating film 19a includes a material with self-planalizing property such as acrylic, siloxane (a material that has a framework structure formed by the bond between silicon (Si) and oxygen (O) and includes at least hydrogen in a substituent), silicon oxide that can be used in coating deposition. In addition, the second interlayer insulating film 19b has a silicon nitride film including argon (Ar). The materials included in the respective layers are not particularly limited, and therefore materials other than the materials mentioned here may be used. Further, a layer including a material other than these materials may be combined. In this way, both of an inorganic material and an organic material, or one of an inorganic material and an organic material may be used to form the second interlayer insulating film 19.

In the light-emitting element 12, in the case where both of the first electrode 13 and the second electrode 14 are formed by using a light-transmitting material, emitted light can be extracted from both the first electrode 13 side and the second electrode 14 side as indicated by outline arrows of FIG. 2A. In the case where only the second electrode 14 is formed by using a light-transmitting material, emitted light can be extracted from only the second electrode 14 side as indicated by an outline arrow of FIG. 2B. In this case, it is preferable that the first electrode 13 includes a highly reflective material or that a film including a highly reflective material (a reflective film) is provided below the first electrode 13. In the case where only the first electrode 13 is formed by using a light-transmitting material, emitted light can be extracted from only the first electrode 13 side as indicated by an outline arrow of FIG. 2C. In this case, it is preferable that the second electrode 14 includes a highly reflective material or that a reflective film is provided above the second electrode 14.

In addition, in the case of the light-emitting element 12, the first electrode 13 may function as an anode while the second electrode 14 functions as a cathode, or alternatively, the first electrode 13 may function as a cathode while the second electrode 14 functions as an anode. However, the transistor 11 is a p-channel transistor in the former case, and the transistor 11 is an n-channel transistor in the latter case.

In the light-emitting device as described above, a plurality of light-emitting elements are arranged in a pixel portion, where each of the light-emitting elements includes the light-emitting element 12 and a transistor for driving the light-emitting element 12. In the case where the emission wavelength of each light-emitting element is the same as the emission wavelength of the light-emitting element 12, the light-emitting device emits monochromatic light. In the case where the emission wavelength of each light-emitting element is different, the light-emitting device is able to emit light of a plurality of colors such as red (R), green (G), and a blue (B).

Examples of a circuit included in a pixel to drive a light-emitting element will be described below with reference to FIGS. 3A to 3C. However, the structure of a circuit for driving a light-emitting element is not to be considered limited to ones shown below.

Figure 3A:
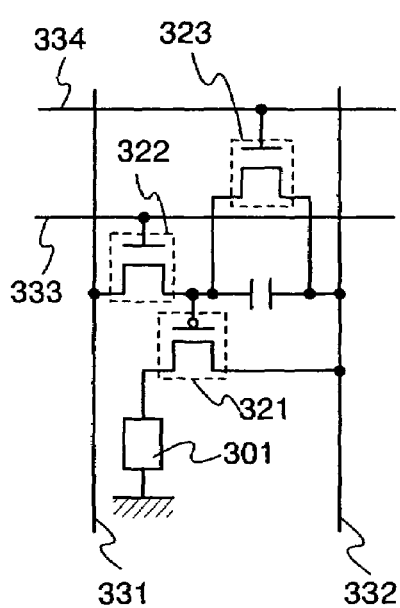
FIGS. 3A to 3C are diagrams illustrating examples of a circuit for driving a light-emitting device according to the present invention.

As shown in FIG. 3A, a circuit for driving a light-emitting element is connected to a light-emitting element 301. The circuit has a driving transistor 321 that determines whether light is emitted or not in accordance with an image signal, a switching transistor 322 that controls input of the image signal, and an erasing transistor 323 that forces the light-emitting element 301 to emit no light independently of the image signal. Here, a source (or a drain) of the switching transistor 322 is connected to a source signal line 331, a source of the driving transistor 321 and a source of the erasing transistor 322 are connected to a power supply line 332 extending to run in parallel with the source signal line 331, a gate of the switching transistor 322 is connected to a first scan line 333, and a gate of the erasing transistor 322 is connected to a second scan line 334 extending parallel to the first scan line 333. In addition, the driving transistor 321 and the light-emitting element 301 are serially connected. It is to be noted that the driving transistor 321 is a p-channel transistor when an electrode of the light-emitting element 301 to function as an anode is connected to the driving transistor 321, or the driving transistor 321 is an n-channel transistor when an electrode of the light-emitting element 301 to function as a cathode is connected to the driving transistor 321.

A driving method in the case where the light-emitting element 301 emits light will be described. When the first scan line 333 is selected in a writing period, the switching transistor 322 that has the gate connected to the first scan line 333 is turned on. Then, an image signal input the source signal line 331 is input through the switching transistor 322 to a gate of the driving transistor 321, and thus, current flows from the current supply line 332 to the light-emitting element 301 to emit light. In this case, the luminance is determined by the value of current flowing to the light-emitting element 301.

Figure 4:
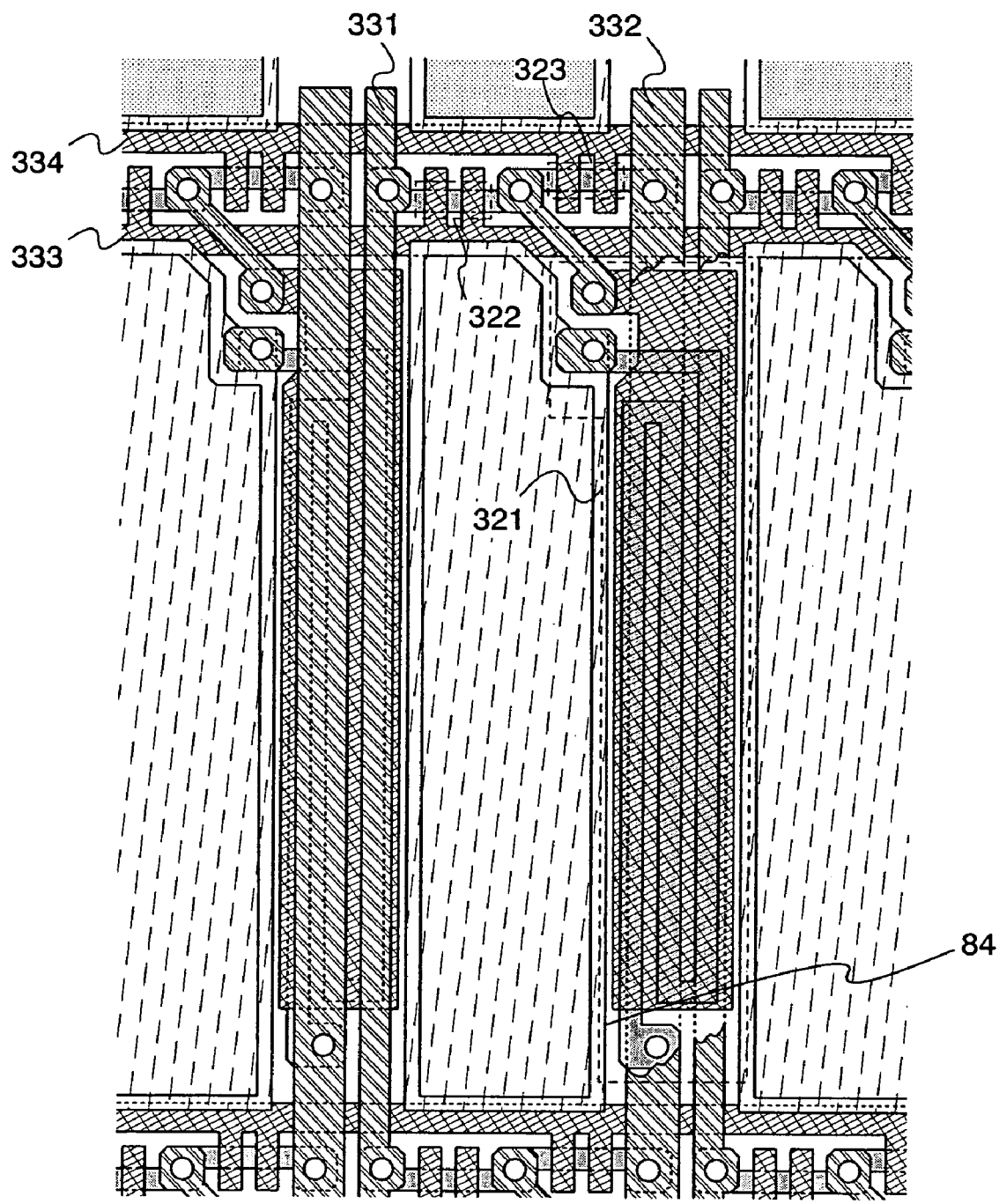
FIG. 4 is a top view of a pixel portion included in a light-emitting device according to the present invention.

FIG. 4 is a top view of a pixel portion of a light-emitting device that has a circuit as shown in FIG. 3A. Reference numerals assigned in FIG. 4 respectively indicate the same components as those in FIG. 3A Further, an electrode 84 of the light-emitting element 301 is shown in FIG. 4.

In addition, the structure of a circuit connected to a light-emitting element is not limited to the structure described here. For example, the same structure as FIG. 3B or 3C to be described may be used.

Next, the circuit shown in FIG. 3B will be described. As shown in FIG. 3B, a circuit for driving a light-emitting element is connected to a light-emitting element 801. The circuit has a driving transistor 821 that determines whether light is emitted or not in accordance with an image signal, a switching transistor 822 that controls input of the image signal, an erasing transistor 823 that forces the light-emitting element 301 to emit no light independently of the image signal, and a current controlling transistor 824 for controlling the value of current supplied to the light-emitting element 801. Here, a source (or a drain) of the switching transistor 822 is connected to a source signal line 831, a source of the driving transistor 821 and a source of the erasing transistor 822 are connected to a power supply line 832 extending to run in parallel with the source signal line 831, a gate of the switching transistor 822 is connected to a first scan line 833, and a gate of the erasing transistor 823 is connected to a second scan line 834 extending in parallel with the first scan line 833. In addition, the current controlling transistor 824 is interposed between the driving transistor 821 and the light-emitting element 801, and serially connected. A gate of the current controlling transistor 824 is connected to a power line 835. Further, the current controlling transistor 824 is formed and controlled so that current flows in a saturation region in voltage-current (Vd-Id) characteristics, and this makes it possible to determine the value of current flowing in the transistor 824. It is to be noted that the driving transistor 821 is a p-channel transistor when an electrode of the light-emitting element 801 to function as an anode is connected to the driving transistor 821, or the driving transistor 821 is an n-channel transistor when an electrode of the light-emitting element 801 to function as a cathode is connected to the driving transistor 821.

A driving method in the case where the light-emitting element 801 emits light will be described. When the first scan line 833 is selected in a writing period, the switching transistor 822 that has the gate connected to the first scan line 833 is turned on. Then, an image signal input the source signal line 831 is input through the switching transistor 822 to a gate of the driving transistor 821. Further, current flows from the power supply line 832 to the light-emitting element 801 through the driving transistor 821 and the current controlling transistor 824 turned on in accordance with a signal from the power line. In this case, the value of current flowing to the light-emitting element 801 is determined by the current controlling transistor 824.

Figure 3B:
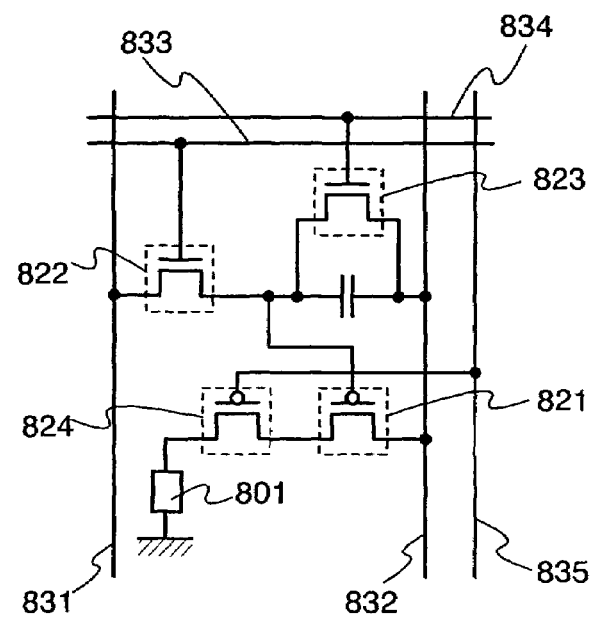
Figure 3C:
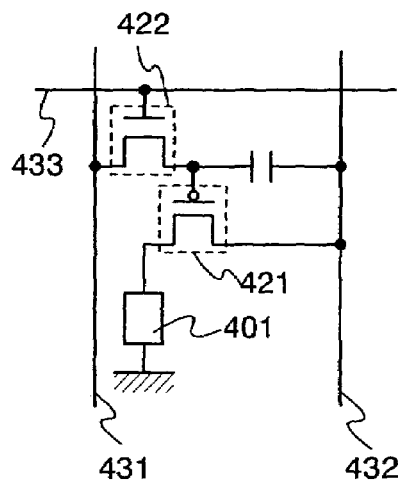
Figure 5:
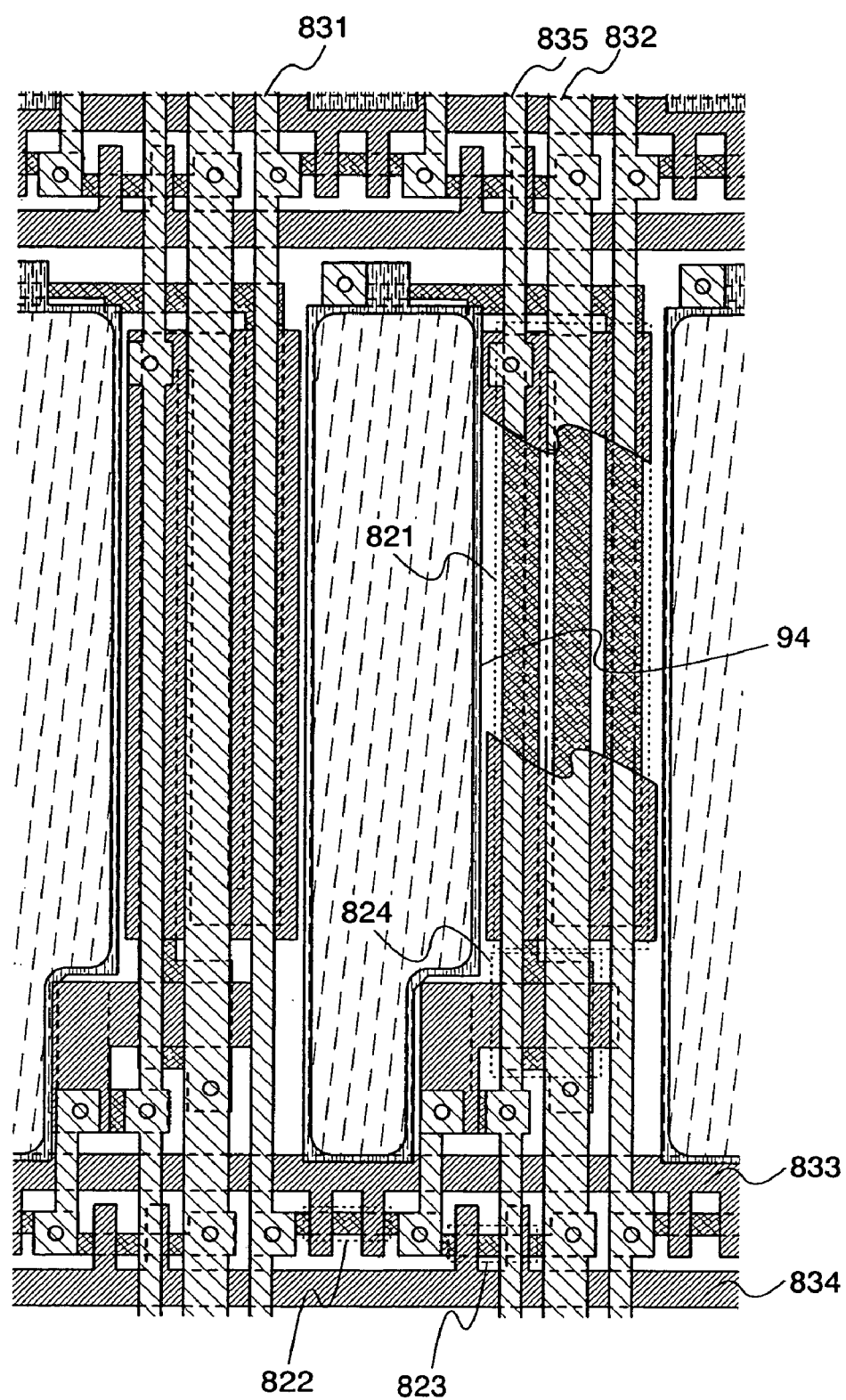
FIG. 5 is a top view of a pixel portion included in a light-emitting device according to the present invention.

FIG. 5 is a top view of a pixel portion of a light-emitting device that has a circuit as shown in FIG. 3B. Reference numerals assigned in FIG. 5 respectively indicate the same components as those in FIG. 3B. Further, an electrode 94 of the light-emitting element 801 is shown in the figure.

Next, the circuit shown in FIG. 3C will be described. A circuit for driving a light-emitting element is connected to a light-emitting element 401. The circuit has a driving transistor 421 that determines whether light is emitted or not in accordance with an image signal and a switching transistor 422 that controls input of the image signal. Here, a source (or a drain) of the switching transistor 422 is connected to a source signal line 431, a source of the driving transistor 421 is connected to a power supply line 432 extending to run in parallel with the source signal line 431, and a gate of the switching transistor 422 is connected to a scan line 433. In addition, the driving transistor 421 and the light-emitting element 401 are serially connected. It is to be noted that the driving transistor 421 is a p-channel transistor when an electrode of the light-emitting element 401 to function as an anode is connected to the driving transistor 421, or the driving transistor 421 is an n-channel transistor when an electrode of the light-emitting element 401 to function as a cathode is connected to the driving transistor 421.

A driving method in the case where the light-emitting element 401 emits light will be described. When the first scan line 433 is selected in a writing period, the switching transistor 422 that has the gate connected to the scan line 433 is turned on. Then, an image signal input the source signal line 431 is input through the switching transistor 422 to a gate of the driving transistor 421, and thus, current flows from the current supply line 432 to the light-emitting element 401 to emit light. In this case, the luminance is determined by the value of current flowing to the light-emitting element 401.

The light-emitting element according to the present invention is an element that is able to show a luminescent color closer to a luminescent color derived from a luminescent material. Therefore, a light-emitting device including the light-emitting element as described above is able to provide favorable display images that have great color reproducibility. In addition, the light-emitting element according to the present invention is able to emit light at a lower driving voltage. Therefore, a light-emitting element including the light-emitting element according to the present invention is able to operate at a lower driving voltage.

The light-emitting device to which the present invention is applied, to which an external input terminal is attached after sealing, is mounted on various electronic equipments.

In the present embodiment, a light-emitting device according to the present invention and an electronic equipment mounted with the light-emitting device will be described with reference to FIGS. 6, 7, and 8A to 8C. However, ones shown in FIGS. 6, 7, and 8A to 8C are just examples, and the structure of the light-emitting device is not to be considered limited to the present embodiment.

Figure 6:
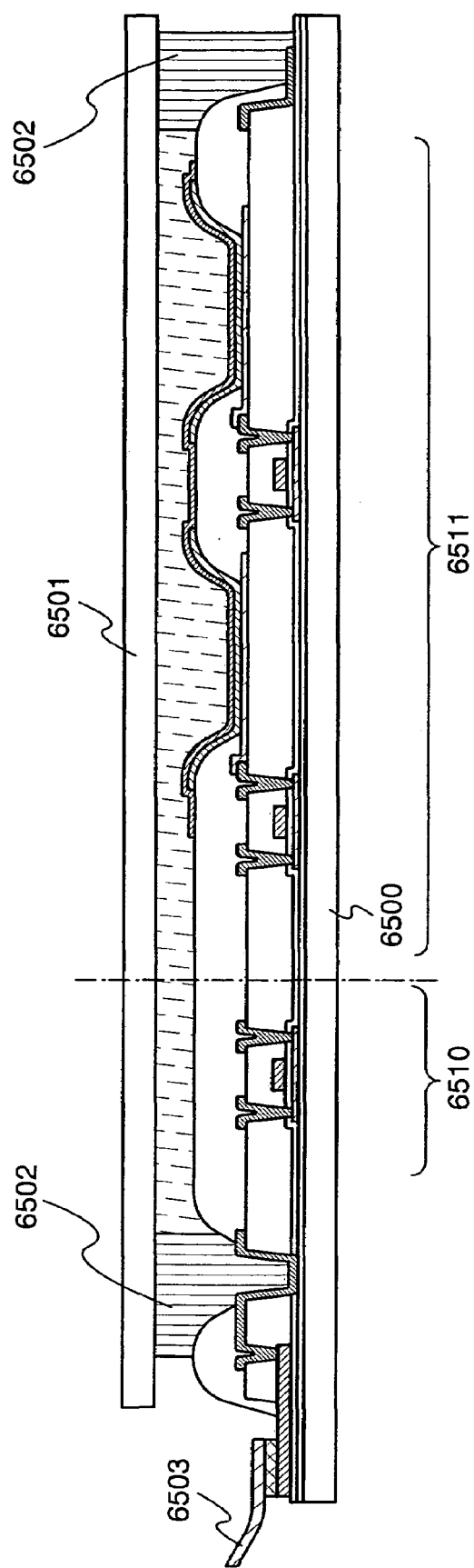
FIG. 6 is a diagram of a light-emitting device according to the present invention after sealing.

FIG. 6 is a cross-section view of a light-emitting device after sealing. A substrate 6500 and a sealing substrate 6501 are bonded with a sealing agent 6502 to sandwich a transistor and a light-emitting element according to the present invention in between. An FPC (Flexible Printed Circuit) 6503 that serves as an external input terminal is attached to an edge of the substrate 6500. In addition, a region sandwiched between the substrate 6500 and the sealing substrate 6501 is filled with an inert gas such as nitrogen or a resin material.

Figure 7:
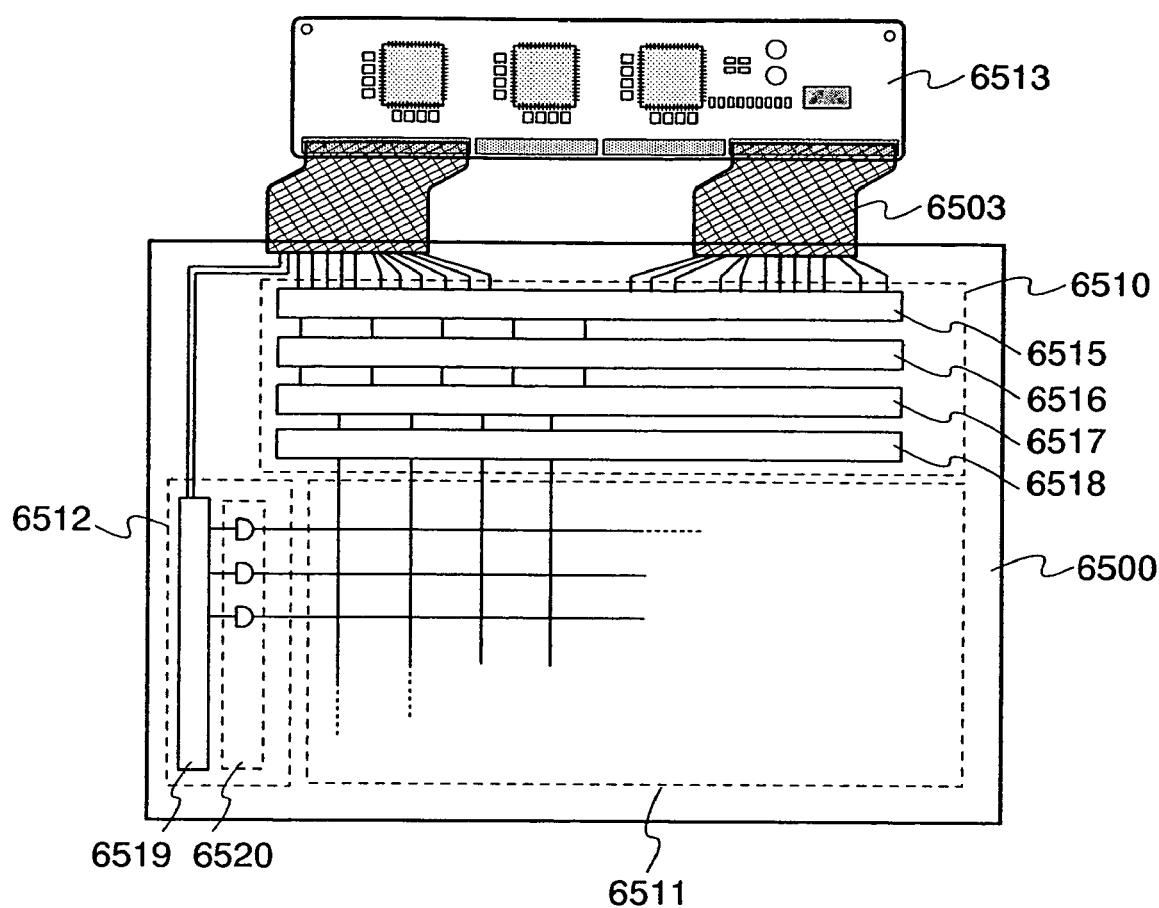
FIG. 7 is a top view showing a frame format of a light-emitting device according to the present invention.

FIG. 7 is an overhead view of showing a frame format of the light-emitting device according to the present invention. In FIG. 7, portions 6510, 6511, and 6512 shown by dashed lines are a driver circuit portion (a source side driver circuit), a pixel portion, and a driver circuit portion (a gate side driver circuit). In the pixel portion 6511, the light-emitting element according to the present invention is provided. The driver circuit portions 6510 and 6512 are connected through the FPC 6503 that serves as an external input terminal and a group of wiring formed on the substrate 6500. By receiving signals such as a video signal, a clock signal, a start signal, and a reset signal from the FPC (Flexible Printed Circuit) 6503, the signals are input to the source side driver circuit 6510 or the gate side driver circuit 6512. Further, a printed wiring board (PWB) 6513 is attached to the FPC 6503. In the driver circuit portion 6510, a shift resister 6515, a switch 6516, and memories (latches) 6517 and 6518 are provided. In the driver circuit portion 6512, a shift resister 6519 and a buffer 6520 are provided. In addition to these, another function may be provided.

Figure 8A:
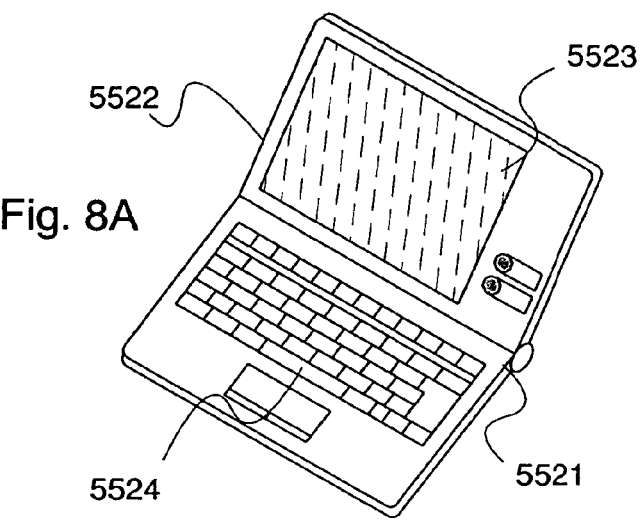
FIGS. 8A to 8C are diagrams illustrating electronic devices according to the present invention.
Figure 8B:
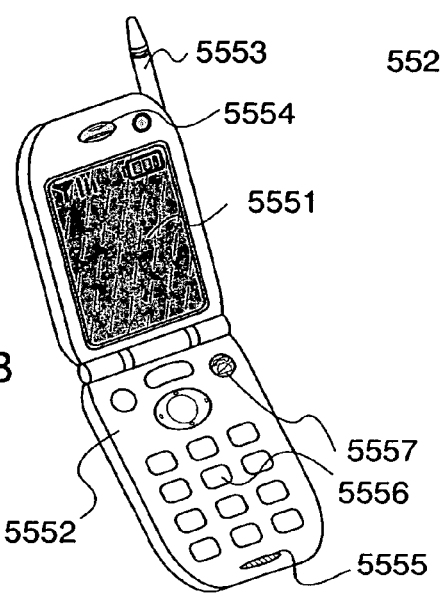
Figure 8C:
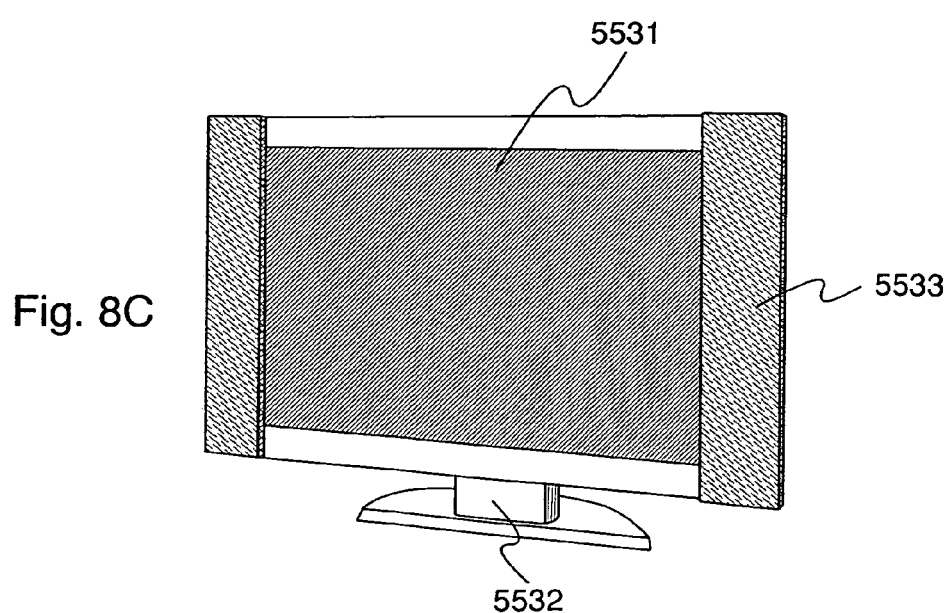

FIGS. 8A to 8C show examples of an electronic equipment mounted with the light-emitting device to which the present invention is applied.

FIG. 8A shows a laptop personal computer manufactured according to the present invention, which includes a main body 5521, a frame body 5522, a display portion 5523, and a keyboard 5524. The personal computer can be completed by incorporating a light-emitting device that has a light-emitting element according to the present invention into the display portion 5523.

FIG. 8B shows a cellular phone manufactured according to the present invention, which includes a main body 5552, a display portion 5551, a voice output portion 5554, a voice input portion 5555, operation keys 5556 and 5557, and an antenna 5553. The cellular phone can be completed by incorporating a light-emitting device that has a light-emitting element according to the present invention into the display portion 5551.

FIG. 8C shows a television manufactured according to the present invention, which includes a display portion 5531, a frame body 5532, and a speaker 5533. The television can be completed by incorporating a light-emitting device that has a light-emitting element according to the present invention into the display portion 5531.

As described above, a light-emitting device according to the present invention is suitable for use as display portions of various electronic equipments.

In the present embodiment, the laptop personal computer, the cellular phone, and the television are described. However, in addition, a light-emitting device that has a light-emitting element according to the present invention may be mounted in devices such as [a cellular phone,] a car navigation system and a lighting apparatus.

The above-described electronic equipments to which the present invention is applied uses a light-emitting element including a triazine derivative according to the present invention as a component of a pixel portion to provide favorable display images. In addition, the electronic equipments to which the present invention is applied can be driven with lower power consumption.

EXAMPLE 1

SYNTHESIS EXAMPLE 1

A synthesis method of 1,3,5-tris(acridone-N-yl)triazine will be described.

Acridone (10.0 g, 54. 6 mmol) was slowly added to a dried THF (tetrahydrofran) suspension (200 mL) of sodium hydride (60% in oil, 2.4 g, 60 mmol) under cooling in ice. After stirring at room temperature for 30 minutes, a dried THF solution (50 mL) of cyanuric chloride (2.50 g, 13. 8 mmol) was dropped. After stirring at room temperature for 12 hours, reflux for 6 hours was performed by heating. After that, about 100 mL of ethanol was added to the reaction mixture, and precipitated solid was filtered. After dissolving the obtained solid in warm chloroform, celite filtration was performed. The filtrate was condensed for recrystallization to obtain a light yellow compound with a yield of 77%.

Measurement of the obtained compound by NMR (Nuclear Magnetic Resonance) could confirm that the compound was 1,3,5-tris(acridone-N-yl) triazine (abbreviation: ACT) represented by a structure formula (71).

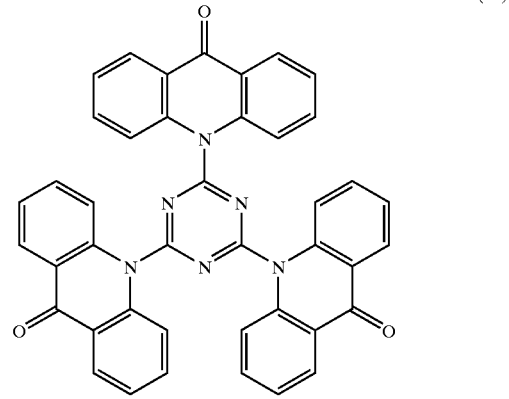

(71)

NMR (Nuclear Magnetic Resonance) spectrum data is shown below.

$^1$H NMR (300 MHz, CDCl$_3$) δ 7.37–7.51 (m, 12H), 7.67 (d, 6H, J=8.4 Hz), 8.35 (dd, 6H, J=1.8, 7.8 Hz)

$^{13}$C NMR (75.5 MHz, CDCl$_3$) δ 121.8, 124.9, 126.1, 127.1, 132.6, 136.4, 140.5, 179.7

In addition, the obtained compound was measured with a melting point measurement system (ATM-01 from AS ONE CORP.) to find that the melting point of the compound was 300° C. or more.

Further, deposition of the obtained compound by evaporation and measurement with a photoelectron spectrometer (AC-2 from Riken Keiki Co., Ltd.) were performed to find that the ionization potential of the thin film compound was −5.6 eV In addition, an absorption spectrum of the thin film compound was measured with an ultraviolet-visible spectrophotometer (V-550 from JASCO Corporation) to find that the energy level of an absorption edge on the longer wavelength side of the absorption spectrum was 3.0 eV. From these results, it was determined that the HOMO level, the LUMO level, the energy gap between the HOMO level and the LUMO level of the material represented by the structure formula (71) are respectively −5.6 eV, −2.6 eV, and 3.0 eV.

SYNTHESIS EXAMPLE 2

A synthesis method of 2,4,6-tris(10-phenyl-dihydrophenazine-5-yl)-1,3,5-triazine will be described.

In a nitrogen atmosphere, phenyllithium (2.0 M dibuthylether solution, 53.0 mmol) was dropped in a dried toluene solution (180 mL) of phenazine (10.1 g, 56.0 mmol) at room temperature. After drying at room temperature for 12 hours, a dried THF solution (50 mL) of cyanuric chloride (2.40 g, 13.2 mmol) was dropped. After holding the reaction mixture at reflux by heating for 6 hours, water was added to the reaction solution, and extraction was performed with toluene. Further, insoluble matter precipitated during the extraction was removed by filtration. The toluene layer was washed with a saturated salt solution, and then, dried, filtered, and condensed with magnesium sulfate. About 300 mL of ether was added to the obtained solid, and ether insoluble matter was obtained by filtration. This solid was purified by recrystallization (twice) with chloroform/ethanol to obtain light brown compound (yield: 45%).

Measurement of the obtained compound by NMR (Nuclear Magnetic Resonance) could confirm that the compound was a material represented by a structure formula (72) (2,4,6-tris(10-phenyl-dihydrophenazine-5-yl)-1,3,5-triazine).

(72)

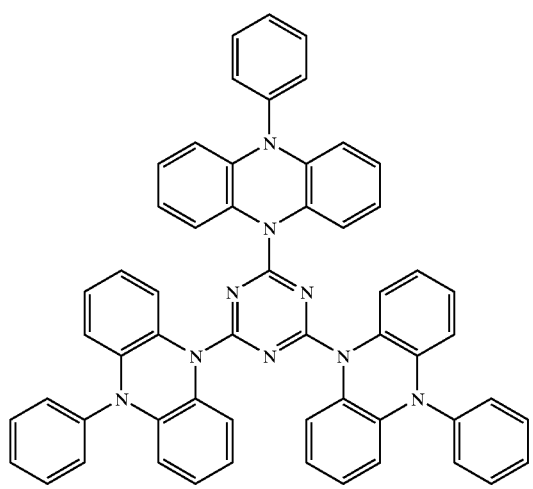

NMR (Nuclear Magnetic Resonance) spectrum data is shown below.

$^1$H NMR (300 MHz, CDCl$_3$) δ 6.25 (dd, 6H, J=1.5, 8.4 Hz), 6.77–6.86 (m, 12H), 7.36–7.58 (m, 21H)

EXAMPLE 2

Figure 10:
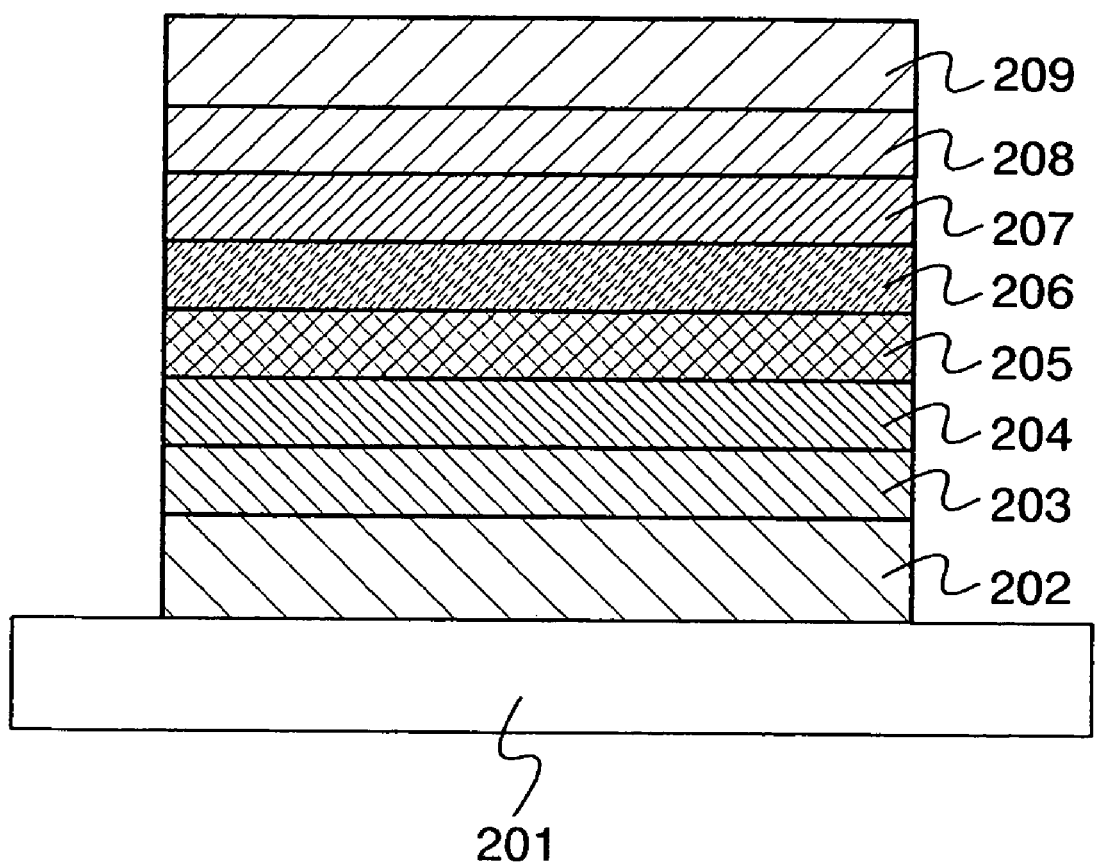
FIG. 10 is a diagram illustrating an example of a light-emitting element according to the present invention.

An example of a light-emitting element manufactured with the use of ACT synthesized in accordance with the method described in Synthesis Example 1 will be described with reference to FIG. 10.

On a substrate 201, an indium tin oxide was deposited by sputtering to form a first electrode 202.

Next, on the first electrode 202, a first layer 203 composed of DNTPD was formed by evaporation. The first layer 203 was formed to be 50 nm in thickness.

Next, on the first layer 203, a second layer 204 composed of NPB was formed by evaporation. The second layer 204 was formed to be 10 nm in thickness.

Next, on the second layer 204, a third layer 205 including CBP and Ir(tpy)$_2$(acac) represented by the following structure formula (73) was formed by co-evaporation. The third layer 205 was formed to be 30 nm in thickness. In addition, in the third layer 205, the molar ratio of Ir(tpy)$_2$(acac) to CBP (=Ir(tpy)$_2$(acac)/CBP) was controlled to be 0.08. By forming the third layer 205 in this way, dispersed Ir(tpy)$_2$(acac) is included in a layer composed of CBP. It is to be noted that co-evaporation indicates an evaporation method in which materials are vaporized respectively from a plurality of evaporation sources provided in a processing room, vaporized materials are mixed in the gas phase and deposited on an object to be processed.

(73)

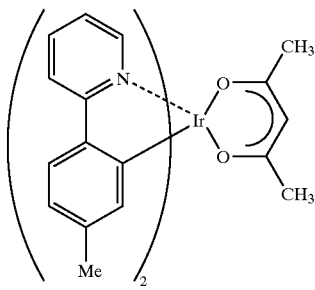

Next, on the third layer 205, a fourth layer 206 composed of ACT was formed by evaporation. The fourth layer 206 was formed to be 10 nm in thickness.

Next, on the fourth layer 206, a fifth layer 207 composed of Alq$_3$ was formed by evaporation. The fifth layer 207 was formed to be 20 nm in thickness.

Next, on the fifth layer 207, a sixth layer 208 composed of calcium fluoride was formed by evaporation. The sixth layer 208 was formed to be 1 nm in thickness.

Next, on the sixth layer 208, a second electrode 209 composed of aluminum was formed by evaporation.

When a voltage is applied to the thus manufactured light-emitting element so that the potential of the first electrode 202 is higher than the potential of the second electrode 209, a hole injected from the first electrode 202 side and an electron injected from the second electrode 209 side are recombined to generate excitation energy, the Ir(tpy)$_2$(acac) included in the third layer 205 is excited. Then, light is emitted when the excited Ir(tpy)$_2$(acac) returns to the ground state.

In this light-emitting element, the first layer 203 has a function of reducing the barrier between the first electrode 202 and the second layer 204. In addition, the second layer 204 has a function of transporting a hole injected from the first electrode 202 side toward the third layer 205. In addition, the third layer 205 is a layer in which a light-emitting region is formed, and functions as a light-emitting layer. In addition, the fourth layer 206 has a function of transporting an electron injected from the second electrode 209 side toward the third layer 205, and a function of preventing a hole from passing from the third layer 205 toward the fifth layer 207. In addition, the fifth layer 207 has a function of transporting an electron injected from the second electrode 209 side toward the third layer 205. In addition, the sixth layer 208 has a function of reducing the barrier between the second electrode 209 and the fifth layer 207.

Figure 11:
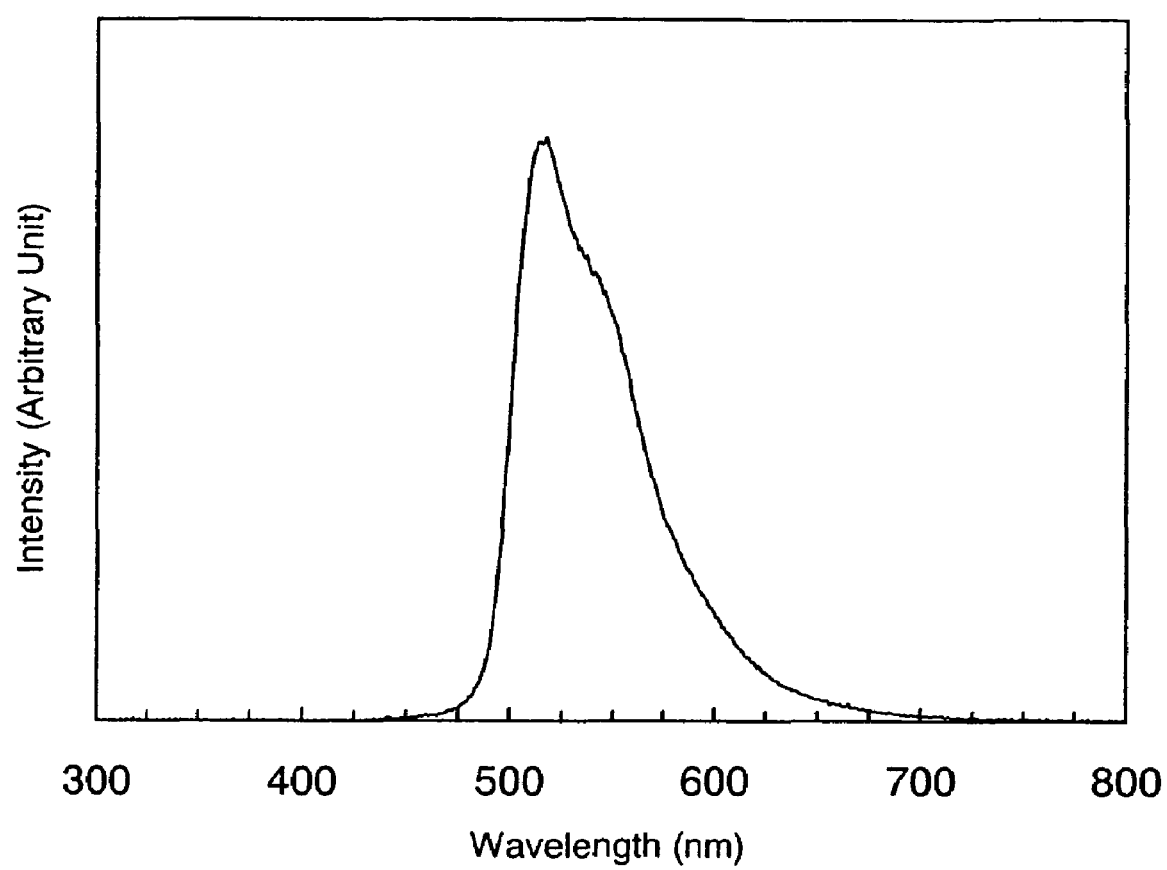
FIG. 11 is a diagram showing an emission spectrum of the light-emitting element manufactured in Example 2.
Figure 12:
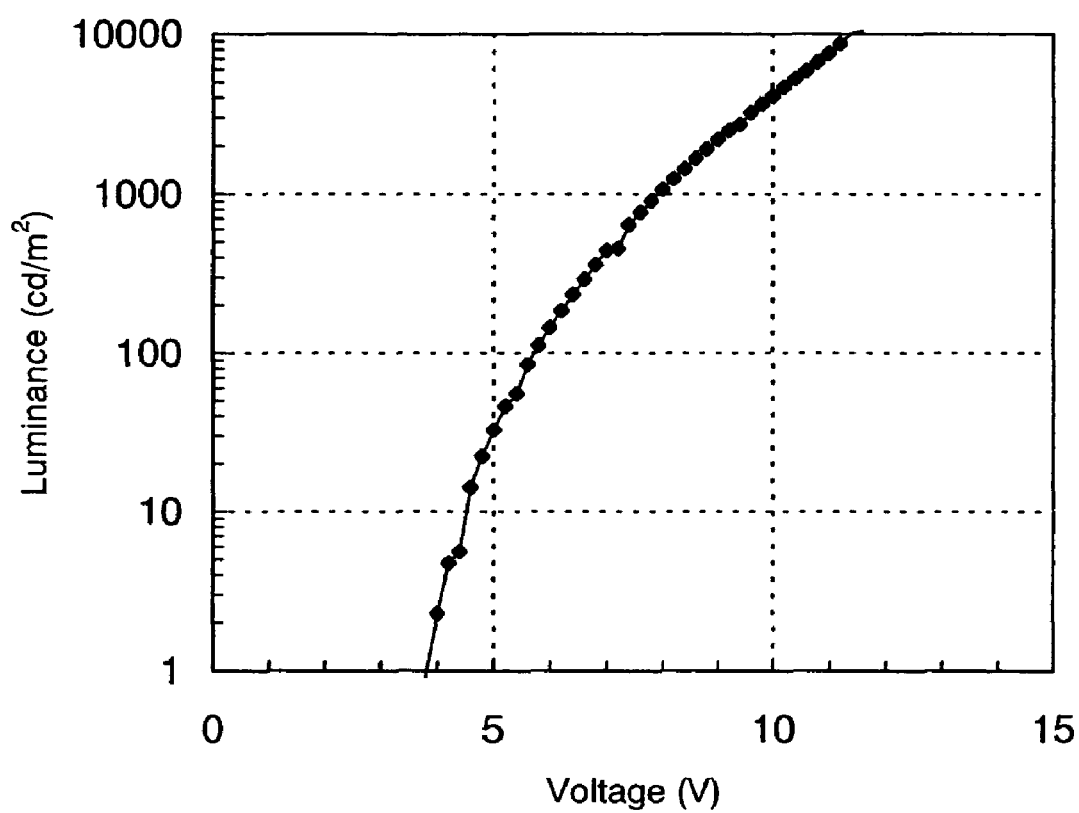
FIG. 12 is a diagram showing voltage-luminance characteristics of the light-emitting element manufactured in Example 2.
Figure 13:
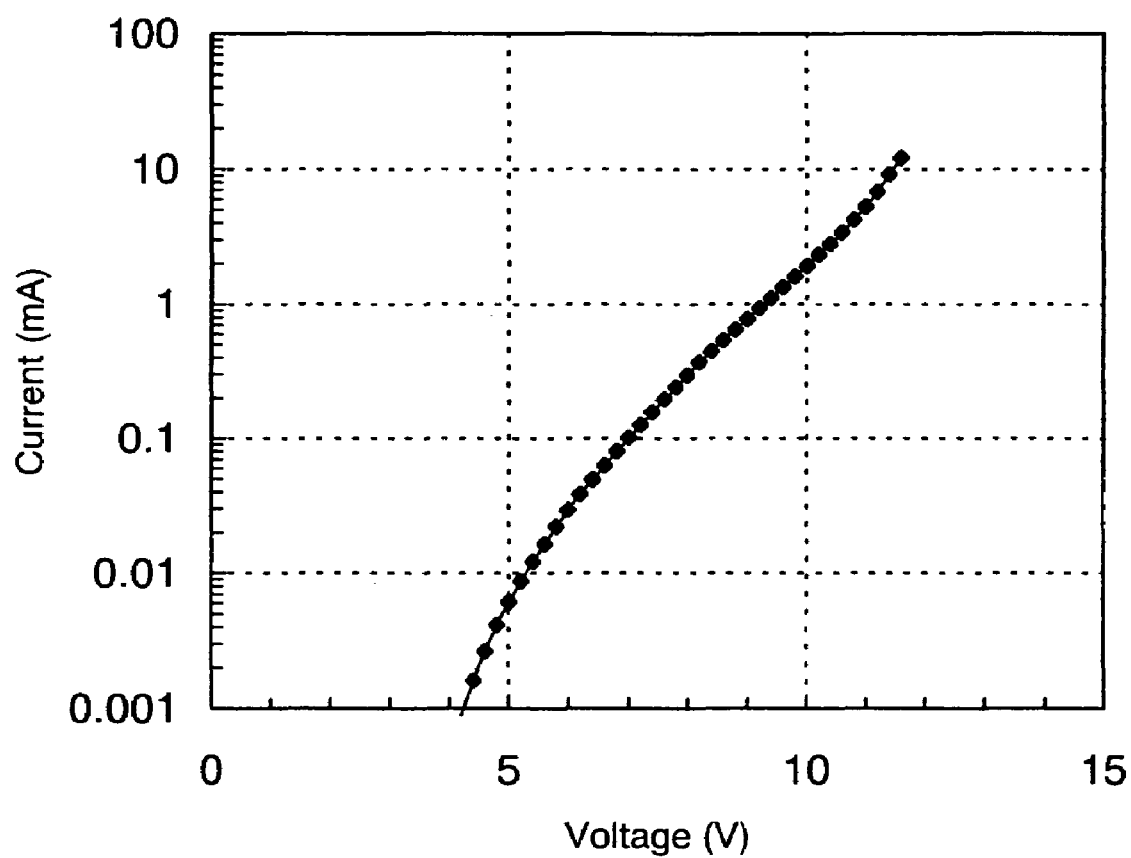
FIG. 13 is a diagram showing voltage-current characteristics of the light-emitting element manufactured in Example 2.

FIGS. 11 to 13 show results of study on the light-emitting element in the present example.

FIG. 11 shows an emission spectrum obtained when a voltage is applied to emit light so that current of 1 mA flows. In FIG. 11, the horizontal axis indicates a wavelength (nm), and the vertical axis indicates intensity (arbitrary unit). In addition, when the color purity of the light-emitting element in the present example was measured in the case of emitting light with a current efficiency of about 1068 cd/m², the CIE chromaticity coordinates were (x,y)=(0.293, 0.656), which was green or greenish luminescence.

FIG. 12 shows a result of study on voltage-luminance characteristics. In FIG. 12, the horizontal axis indicates a voltage (V), and the vertical axis indicates a luminance (cd/m²). FIG. 13 shows a result of study on voltage-current characteristics. In FIG. 13, the horizontal axis indicates a voltage (V), and the vertical axis indicates a current value (mA). Further, the luminescence extraction side of the light-emitting element as a measuring object has an area 2×2 mm².

Since the fourth layer 206 including the triazine derivative according to the present invention is provided to come in contact with the third layer 205 including Ir(tpy)$_2$(acac) that functions as a luminescent material in the light-emitting element in the present example, a hole and an electron are recombined efficiently in the third layer 205, excitation energy transfer from the third layer 205 toward the fifth layer 207 is unlikely to occur. Therefore, luminescence derived from Ir(tpy)$_2$(acac) can be obtained efficiently. In this way, by using a triazine derivative according to the present invention, it is possible to manufacture a light-emitting element from which luminescence derived from a luminescent material, in particular, luminescence derived from a luminescent material that emit phosphorescence can be obtained efficiently.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

What is claimed is:

1. A triazine derivative represented by a general formula (1),

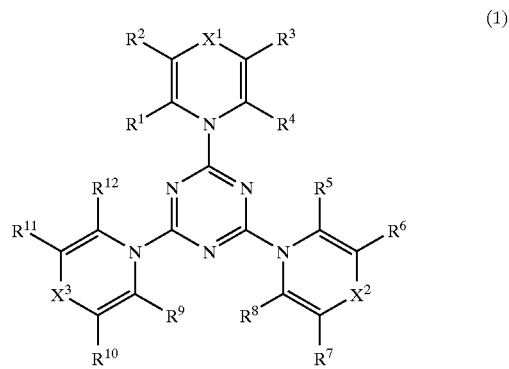

wherein $R^1$ to $R^{12}$ are individually any one of hydrogen, an alkyl group, an alkoxy group, a halogeno group, acyl group, an alkoxycarbonyl group, an aryl group, and a hetero cyclic ring, or $R^1$ and $R^2$, $R^3$ and $R^4$, $R^5$ and $R^6$, $R^7$ and $R^8$, $R^9$ and $R^{10}$, and $R^{11}$ and $R^{12}$ are individually bonded to form any one of an aromatic ring, a heterocyclic ring, and an alicyclic ring, and $X^1$ to $X^3$ are individually any group of formulas (2) to (7),

wherein $R^{13}$ and $R^{14}$ are individually any one of hydrogen, an alkyl group, an aryl group, and a heterocyclic ring, or bonded to form an alicyclic ring, $R^{15}$ is any one of hydrogen, an aryl group, and a heterocyclic ring, $R^{16}$ and $R^{17}$ are individually any one of hydrogen, an aryl group, a heterocyclic ring, and a cyano group, and $R^{18}$ is any one of hydrogen, an alkyl group, an aryl group, and a heterocyclic ring.

2. A triazine derivative represented by a general formula (8), (8)

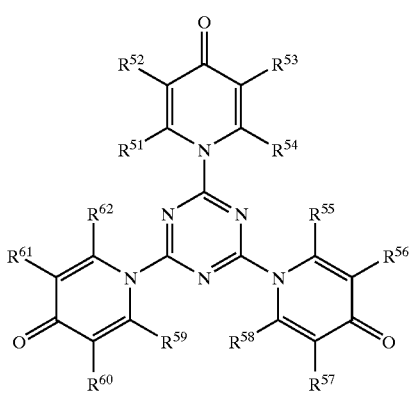

wherein $R^{51}$ to $R^{62}$ are individually any one of hydrogen, an alkyl group, an alkoxy group, a halogeno group, acyl group, an alkoxycarbonyl group, an aryl group, and a hetero cyclic ring, or $R^{51}$ and $R^{52}$, $R^{53}$ and $R^{54}$, $R^{55}$ and $R^{56}$, $R^{57}$ and $R^{58}$, $R^{59}$ and $R^{60}$, and $R^{61}$ and $R^{62}$ are individually bonded to form any one of an aromatic ring, a heterocyclic ring, and an alicyclic ring.

3. A triazine derivative represented by a general formula (9), (9)

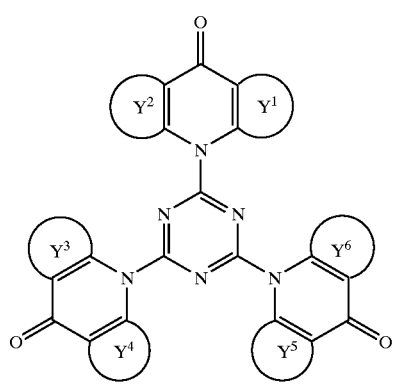

wherein $Y^1$ to $Y^6$ are individually any one of an aromatic ring, a heterocyclic ring, and an alicyclic ring.

4. A triazine derivative represented by a general formula (10), (10)

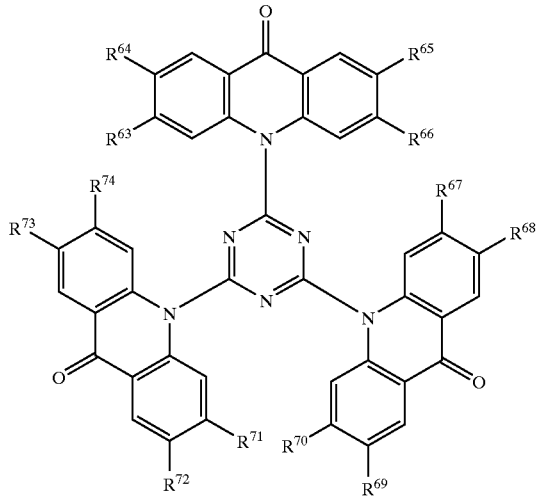

wherein $R^{63}$ to $R^{74}$ are individually any one of hydrogen, an oxo group, and an alkyl group.

5. A triazine derivative represented by a general formula (11), (11)

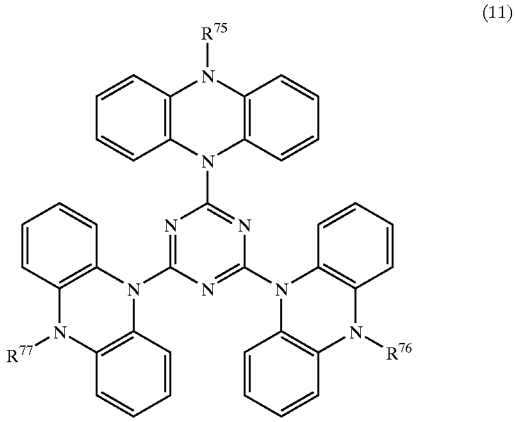

wherein $R^{75}$ to $R^{77}$ are individually any one of hydrogen, an aryl group, and a heterocyclic group.

6. A triazine derivative represented by a general formula (12), (12)

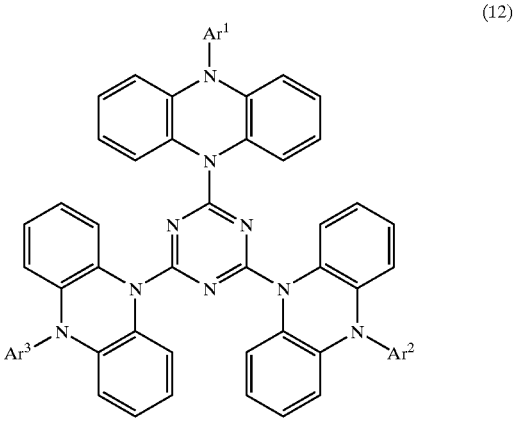

wherein $Ar^1$ to $Ar^3$ are individually an aryl group.

* * * * *